United States Patent [19]
Murow et al.

[11] Patent Number: 5,664,206
[45] Date of Patent: Sep. 2, 1997

[54] METHOD AND APPARATUS FOR AUTOMATING THE LOCALIZATION OF A COMPUTER PROGRAM

[75] Inventors: Jaime Murow, Cupertino; Gary D. Hethcoat, Santa Clara; Richard J. Kwan, Fremont; Hideki Hiura, Mountain View, all of Calif.

[73] Assignee: Sun Microsystems, Inc., Mountain View, Calif.

[21] Appl. No.: 407,152

[22] Filed: Mar. 17, 1995

Related U.S. Application Data

[63] Continuation of Ser. No. 181,712, Jan. 14, 1994.

[51] Int. Cl.$^6$ ........................................ G06F 17/20
[52] U.S. Cl. ........................ 704/8; 395/705; 704/5
[58] Field of Search ............... 364/419.01, 419.02, 364/419.03, 419.16; 395/600, 758, 755, 752, 705

[56] References Cited

U.S. PATENT DOCUMENTS

| | | | |
|---|---|---|---|
| 4,706,212 | 11/1987 | Toma | 364/419.02 |
| 4,731,735 | 3/1988 | Borgendale et al. | 364/200 |
| 4,870,610 | 9/1989 | Beffer | 364/419.02 |
| 4,916,614 | 4/1990 | Kaji et al. | 364/419.02 |
| 4,953,088 | 8/1990 | Suzuki et al. | 364/419.02 |

(List continued on next page.)

OTHER PUBLICATIONS

"Implementing Locale as Dynamically Loaded Shared Object Files", IBM Technical Disclosure Bulletin, vol. 34 No. 12, May 1992, New York, U.S. pp. 117–118.

"Globalization Tools and Processes in the HP Component Monitoring System", Hewlett–Packard Journal, Oct. 1991, U.S., vol. 42, No. 4, ISSN 0018–1153, pp. 37–40.

"Writing Localizable Software for the Macintosh" by Daniel R. Carter, Addison–Wesley 1992, Chapter 2, pp. 9–28.

"Adapt Your Program for Worldwide Use with Windows . . . " by William S. Hall Microsoft System Journal, Nov.–Dec. 1991 pp. 29–45.

(List continued on next page.)

*Primary Examiner*—Gail O. Hayes
*Assistant Examiner*—Gita D. Shingala
*Attorney, Agent, or Firm*—Erwin J. Basinski

[57] ABSTRACT

The present invention provides a system and process which has the advantages of shortening the time and cost required to create a new localized version of a software product by automating much of the language translation process; by providing tools to automate the modifications to the program being localized, thereby reducing the probability of creating errors in the localization process and providing some measure of consistency between subsequently localized new releases of the product, and between different locales. The system disclosed includes an environment and tools to develop software modules to create methods to display, enter or print various single and multi-byte character sets. Moreover the system disclosed provides a mechanism for an independent software developer to localize a software product, using only a binary copy of the target program and the localization tool kit for that product. This will permit the Software manufacturer to contract with developers in various countries to perform the product localization for their respective countries, minimizing risks by not having to provide the developers with a source code version of the portions of the product which do not require localization, and assuring rapid and consistent versions of the localized product through the use of the tool kit provided for that product. The invention provides a method and apparatus for creating a localized version of a target computer program product by first creating a binary version of the localized materials using the localization kit, and then using the localization kit to overlay this binary version of the localized materials onto a binary version of the target computer program product. The localization of certain locale date in the target computer program binary image is also facilitated. The localization kit also provides tools to test and verify the localized version of the target computer program product. The system disclosed also provides a framework wherein new localization tools can be easily incorporated into the overall process.

35 Claims, 30 Drawing Sheets

GENERAL LOCALIZATION PROCESS

U.S. PATENT DOCUMENTS

| | | | |
|---|---|---|---|
| 5,060,146 | 10/1991 | Chang et al. | 364/419.16 |
| 5,243,519 | 9/1993 | Andrew et al. | 395/758 |
| 5,267,156 | 11/1993 | Nomiyama | 364/920.4 |
| 5,299,125 | 3/1994 | Baker et al. | 364/419.08 |
| 5,303,151 | 4/1994 | Neumann | 364/419.02 |
| 5,432,948 | 7/1995 | Davis et al. | 395/800 |
| 5,434,776 | 7/1995 | Jain | 364/419.1 |
| 5,442,782 | 8/1995 | Malatesta et al. | 364/419.16 |

OTHER PUBLICATIONS

"Apple jans quest for universal character . . . " by Said MacWeek v5, n8, p. 5; Feb. 26, 1991.

"Apple slow to go global with Wordscript tools", by McManus, Neil; MacWeek, v7, n4, p 1(2); Jan. 25, 1993.

"The Standard Ctt Library"by Allison, Chick Dec. 1994; File 275 acc. 01829411.

"Japanese Language Services" http://www.japanese.com/.

GENERAL LOCALIZATION PROCESS

Overall localization process flow diagram

EXEMPLARY INTERNATIONALIZED TARGET PROGRAM

HELP DOCUMENTATION

GLOSSARY TOOL

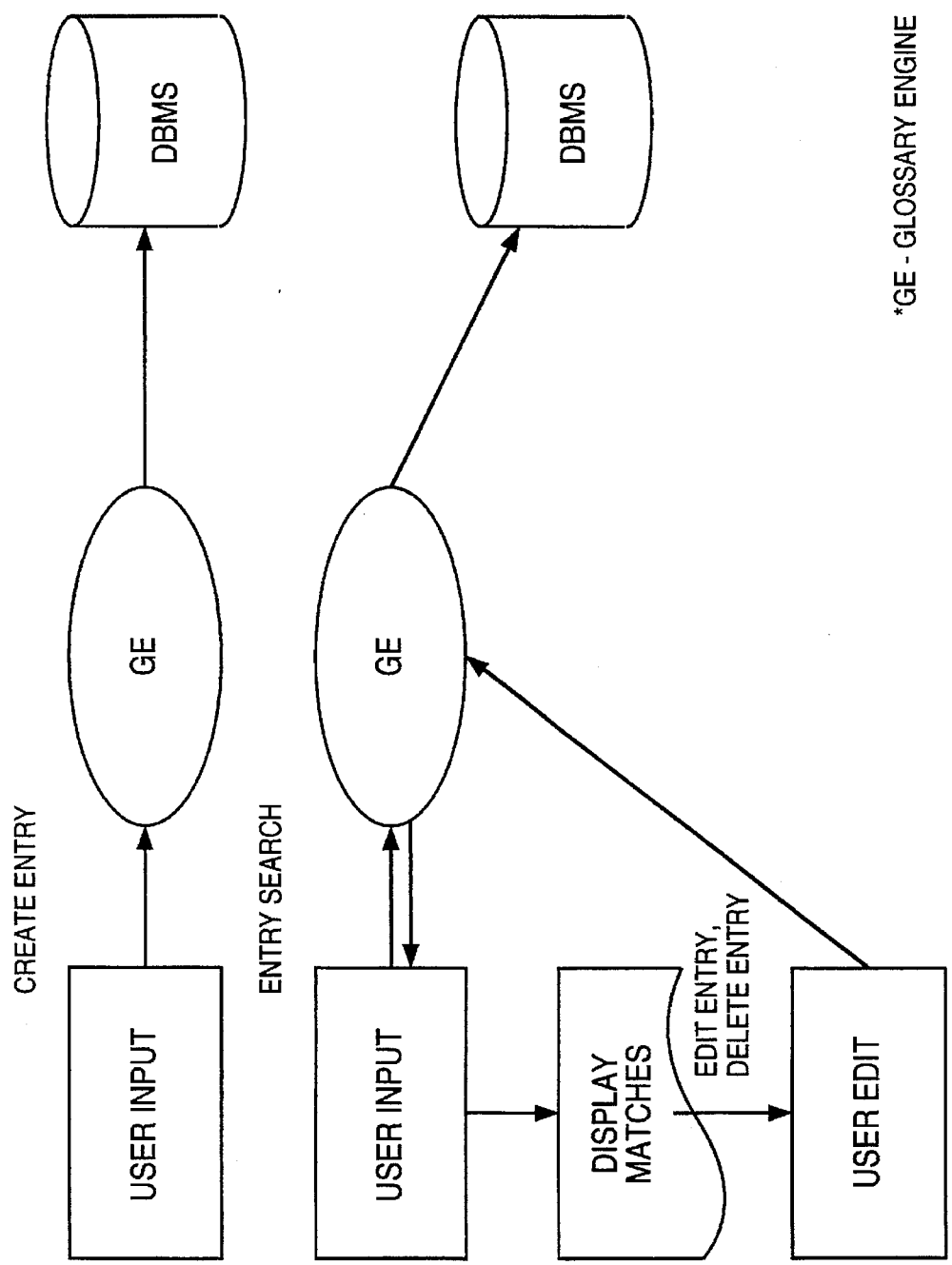
FIG. 13 GLOSSARY FLOW

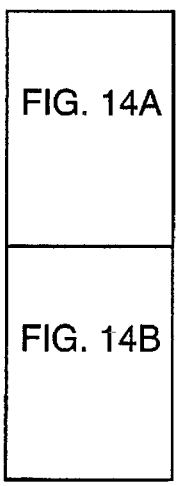
FIG. 14A
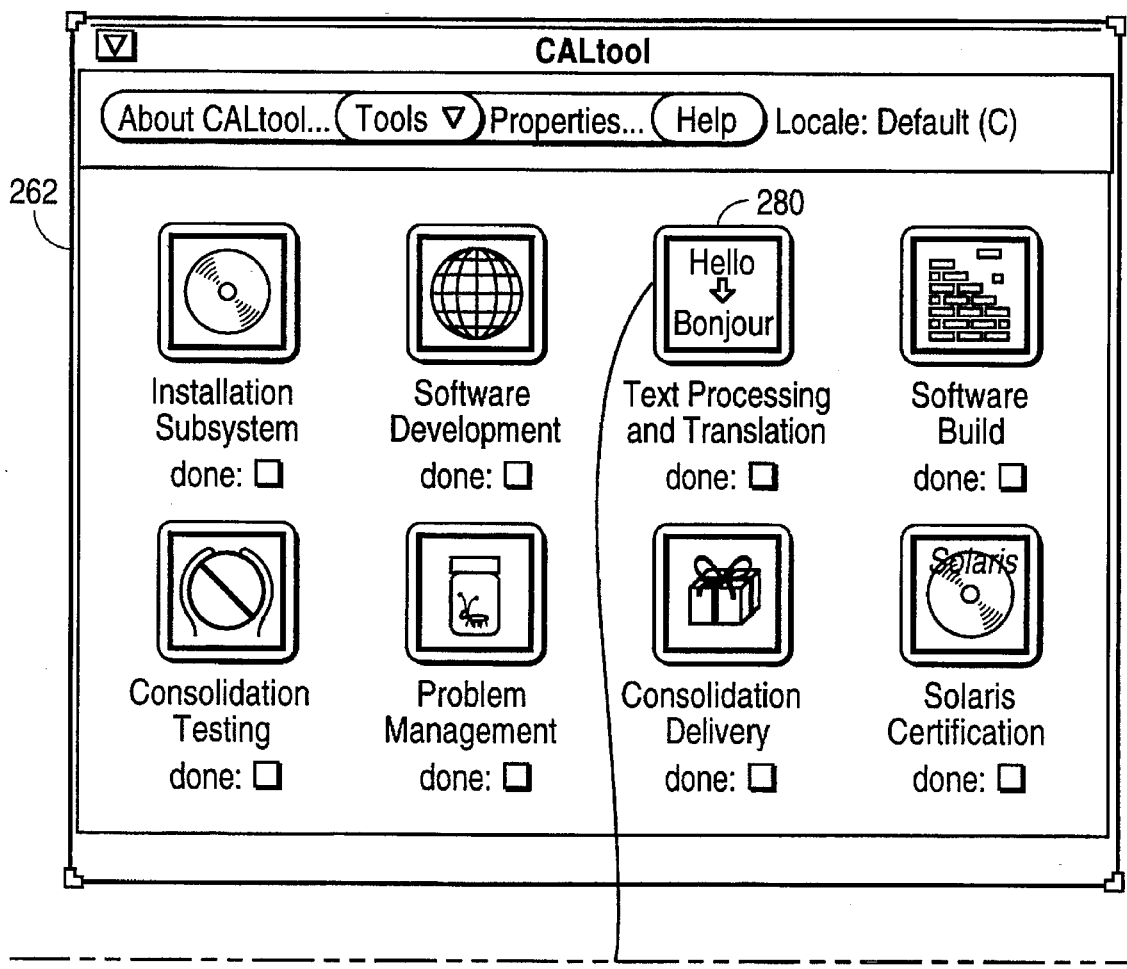

External Interface

The name space manager is represented as a convenient library which all the l10n Kit components can invoke. The library interface is as follows.

```
typedef char* NSDomain;
typedef char* NStoken;
class NameSpace {
public:
    char* NSResolve (NSDomain_t domain, NStoken_t token,
        unsigned int vOffset) ;
    void NSRegister (NSDomain_t domain, NStoken_t token,
        unsigned int vOffset, char* value) ;
    NameSpace () ;
    ~NameSpace () ;
}
```

The parameters to NSResolve are as follows:

| Parameter | Description |
| --- | --- |
| domain | specify the name space domain name. |
| token | specify the token to retrieve the string. |
| vOffset | version number offset from the latest version. 0 means latest. |

The NameSpace : : NSResolve () method resolves the specified token of the domain and returns the full phisical name resolved.

The NameSpace : : NSRegister () method registers the specified revision of the token of the domain into the name space object database.

FIG. 19

*Code Example*   Pseudo-code for Name Space Object

```
DomList  domainList;
TokenList  tokenlist;

NSinitialize ()
{
    determine location of name space database
    load database
    for each entry in database {
        parse domain name; find corresponding DomList
        read argument string, expand %x variables into full names
    }
}

NSResolve (domain, token, relativeRev)
{
    if domain or token is empty, then return NULL;
    tokenlist = findDomain (domain, relativeRev);
    find token in tokenlist;
    when found, return token; else return NULL;
} findDomain (domain, relativeRev)
{
    d = domain name based on (domain, relativeRev);
    find d in domainList;
    when found, load domain d;

return tokenList of domain d;
}
```

FIG. 20

Location Information Database Architecture

The location information database is a simple correspondence list of *token* and the *string* indexed by the *domain* in the filesystem. The *string* can include the pre-defined variable, which is referenced by %prefix. The format of the location information database is as follows:

domain    token    string

Fields of location information database

| Field | Description |
|---|---|
| domain | The name of the domain registered. The definition of the token is application dependent. |
| token | The name of the token registered. The definition of the token is application dependent. |
| :string | The string to be converted. The following variables are defined in the release 1:<br>%L    current locale name<br>%H    L10N Kit install home directory path<br>%V    vendor name<br>%R    release revision<br>%P    platform name |

FIG. 21

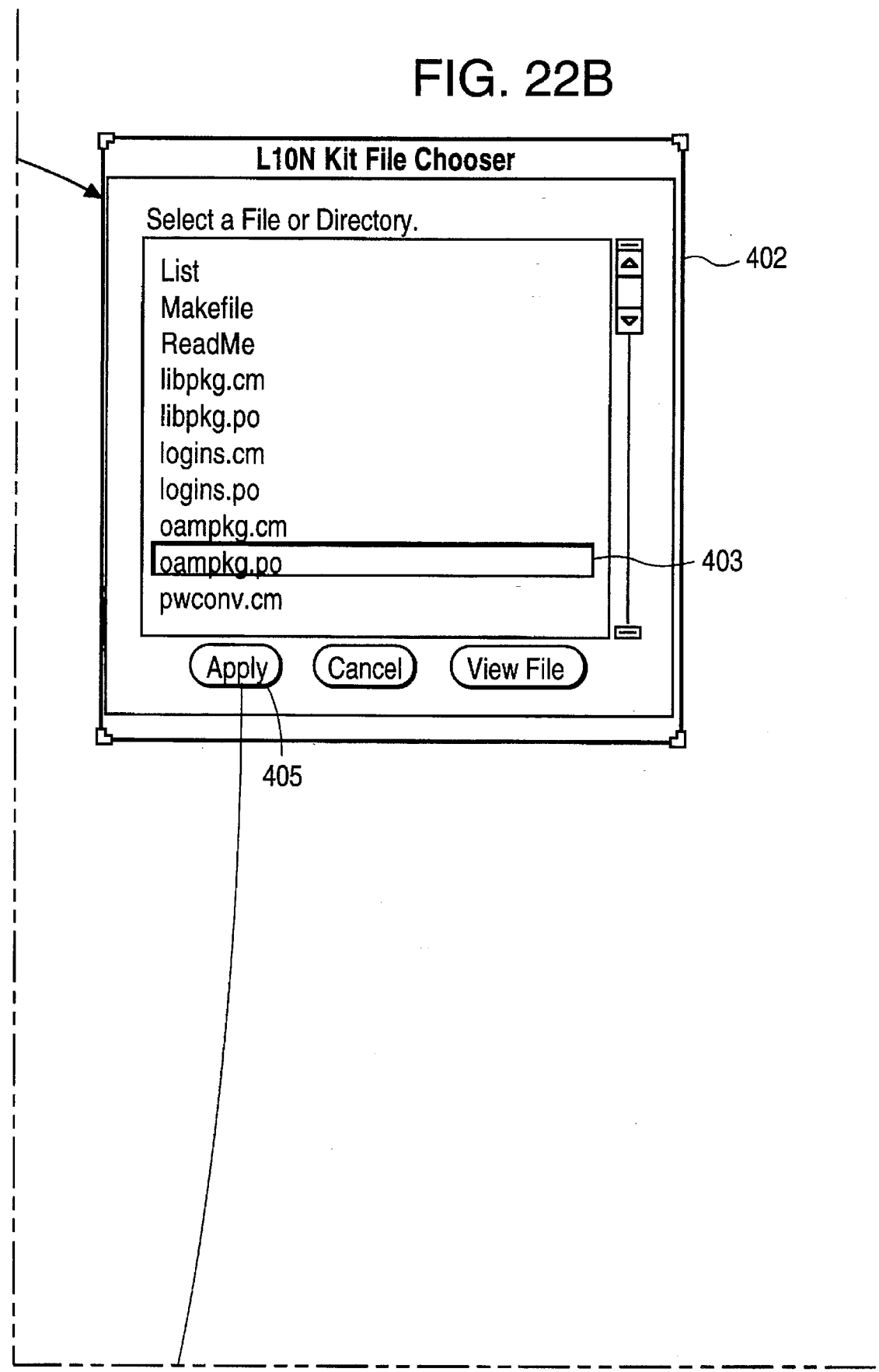

METHOD AND APPARATUS FOR AUTOMATING THE LOCALIZATION OF A COMPUTER PROGRAM

This is a continuation of application Ser. No. 08/181,712, filed Jan. 14, 1994.

BACKGROUND OF THE INVENTION

1. Field of the Invention

This invention generally relates to improvements in systems and processes used for generating a computer program, and more specifically to a system for use in translating and adapting a computer program product written for use in one country to one which is usable in another country. The system provided by this invention, automates many of the processes required to adapt and translate a computer program product to the language, customs and culture of a foreign market. This process of translation and adaptation is generally referred to as "LOCALIZATION" of the target software product.

2. Description of the Related Art

As computer hardware and software vendors expand their market to Europe and the Far East, they are required to modify the related operating system and applications software to accommodate the language, customs and culture of the individual target markets. Many of these companies now achieve half of their total revenues from such markets.

Localization of computer program products generally includes some or all of the following:

translating software messages, menus, documentation and packaging;

changing the time, date, decimal and currency formats;

changing comparison and sorting routes;

changing character sets, input methods and keyboard layouts;

changing displayable and printable fonts, and printing devices;

modifying input and output software routines to display, enter and print diverse single and multi-byte character sets; and accommodating local laws and customs.

Different cultures and countries have different rules for punctuation, word order, sorting, the order of items in addresses, currency measures and conversions, number formats and other local idiosyncrasies. The Far Eastern countries have alphabets that include many thousands of characters (requiring multiple bytes of data to represent a single character) whereas the ASCII character set used in the United States numbers less than 256 characters (which can be accommodated by a single 8 bit byte). Many native languages and customs have different meanings for certain symbols used as computer icons as well as colors which may be used to indicate some special meaning.

Localization of a computer product from one locale to another to accommodate such differences more specifically, involves:

translation of the software documentation into the new language;

translation of the textual messages embedded in the software into the new language;

incorporation of additional software facilities to make input and output of the new language and perhaps new characters possible;

adapting the software to accommodate the customs and conventions of the new locale; and testing and assurance that the modified product works as intended.

This process of Localization is very labor intensive and requires people who know the native language of the new country as well as the basics of computer program architecture and construction. An example of the process of Localization is thoroughly described in the book titled "Writing Localizable Software for the Macintosh®" by Daniel R. Carter, Addison-Wesley Publishing, 1992, ISBN 0-201-57013-0. (MACINTOSH is a registered trademark of Apple Computer, Inc.).

Much progress has been made in designing and writing computer software to make the process of "Localizing" a product easier by the use of special data bases of internal messages instead of embedding them at various places in the code, by establishing special resource files to specify formats for time, currency, numbers, units of measure, etc.,and generally providing interfaces that can be modified dynamically to change from one environment to another. This way of designing and producing software that can be easily adapted to local markets is defined as "INTERNATIONALIZATION". See for example, "Solaris® International Developer's Guide" by Bill Tuthill, SunSoft Press (Prentice Hall), 1993, ISBN 0-13-031063-8. (SOLARIS is a registered trademark of Sun Microsystems, Inc.).

The Problem

The basic localization process at best, is extremely difficult and time consuming in general, and requires personnel with an unusual mount of training in the local languages, customs, mores as well as in the art of the computer development, modification and testing processes. A computer hardware or software vendor is faced with hiring internal staff familiar with each country and training them to provide the localization services for their native country. Finding, hiring and training such individuals is a very costly undertaking. Moreover, the complexity of the present processes and procedures makes the likelihood of induced errors very high, and the additional effort in testing and error correction very costly. Additionally, customers are demanding consistency in the localization of different releases of the same product, as well as demanding new releases be made available to them either at the same time as new releases are announced in the U.S. or shortly thereafter. Finally, networking protocols and inter-vendor operation and application development by independent developers creates a demand for consistency in the localization process.

SUMMARY OF THE INVENTION

The present invention provides a system and process which has the advantages of shortening the time and cost required to create a new localized version of a software product by automating much of the language translation process; by providing tools to automate the modifications to the program being localized, thereby reducing the probability of creating errors in the localization process and providing some measure of consistency between subsequently localized new releases of the product. Moreover, the system disclosed provides a mechanism for a software manufacturer to safely make use of indigenous independent software developers to localize the vendor's software product, providing only a binary copy of the target program and the localization tool kit for that product. This will permit the Software manufacturer to contract with developers in various countries to perform the product localization for their respective countries, minimizing risks by not having to provide the developers with a source code version of the product, and assuring rapid and consistent versions of the localized product through the use of the tool kit provided for that product. The system disclosed also provides a framework wherein new localization tools can be easily incorporated into the overall process.

A system for localizing a target computer program in binary form is disclosed wherein the target computer program in binary form is loaded onto a computer, followed by the loading of a localization kit on the same computer, the localization kit having tools to assist a user to localize portions of the target computer program and, when completed, to link the localized portions with the target computer program to produce a localized version of the original target computer program in binary form.

Also disclosed is the localization kit being made up of a number of program tools which are independent of a target computer program and a number of flies including text and documentation files which are dependent upon a particular release version of a target computer program. Among the tools included in the Localization kit is a Computer Aided Localization tool ("CALtool") which is designed to automatically guide the user in the steps and activities to successfully localize a target computer program. Other tools disclosed include a Glossary tool, a text translation tool, a problem reporting tool, a build tool, a test and performance tool and a name space server tool.

Also disclosed is a method of localizing a target computer program in binary form using a localization kit to localize portions of the target computer program and associate these portions with the target computer program to produce a localized target computer program. The method of using the localization kit including the use of a Computer Aided Localization tool ("CALtool") which is designed to automatically guide the user in the steps and activities to successfully localize a target computer program is also disclosed.

Also disclosed is a localized version of a target computer program which includes a first portion of the target computer program which has not been localized, in binary form, and a second portion which has been localized and combined with the first portion into a binary version of a localized version of a target computer program.

Also disclosed is a Naming System which can build a first data base of user program specific symbols and symbolic file/directory names at the time the user programs are assembled; which can build a second data base at the time a set of programs and files to be operated upon are installed, the second data base containing entries which relate the user program specific symbols and symbolic file/directory names to the actual locations of the installed files; and which can, at the time the user programs are executed, accept a reference to the user program specific symbols and, using the first and second data bases, return a location pointer for the corresponding file/directory.

DESCRIPTION OF THE DRAWINGS

The objects, features and advantages of the system of the present invention will be apparent from the following description in which:

FIG. 13 illustrates the Glossary Data Base.

FIG. 19 illustrates an exemplary external interface of the Independent Naming Server system.

FIG. 20 illustrates an exemplary Name Space Object in pseudo-code.

FIG. 21 illustrates an exemplary Location Information Database Architecture.

NOTATIONS AND NOMENCLATURE

Figure 1:
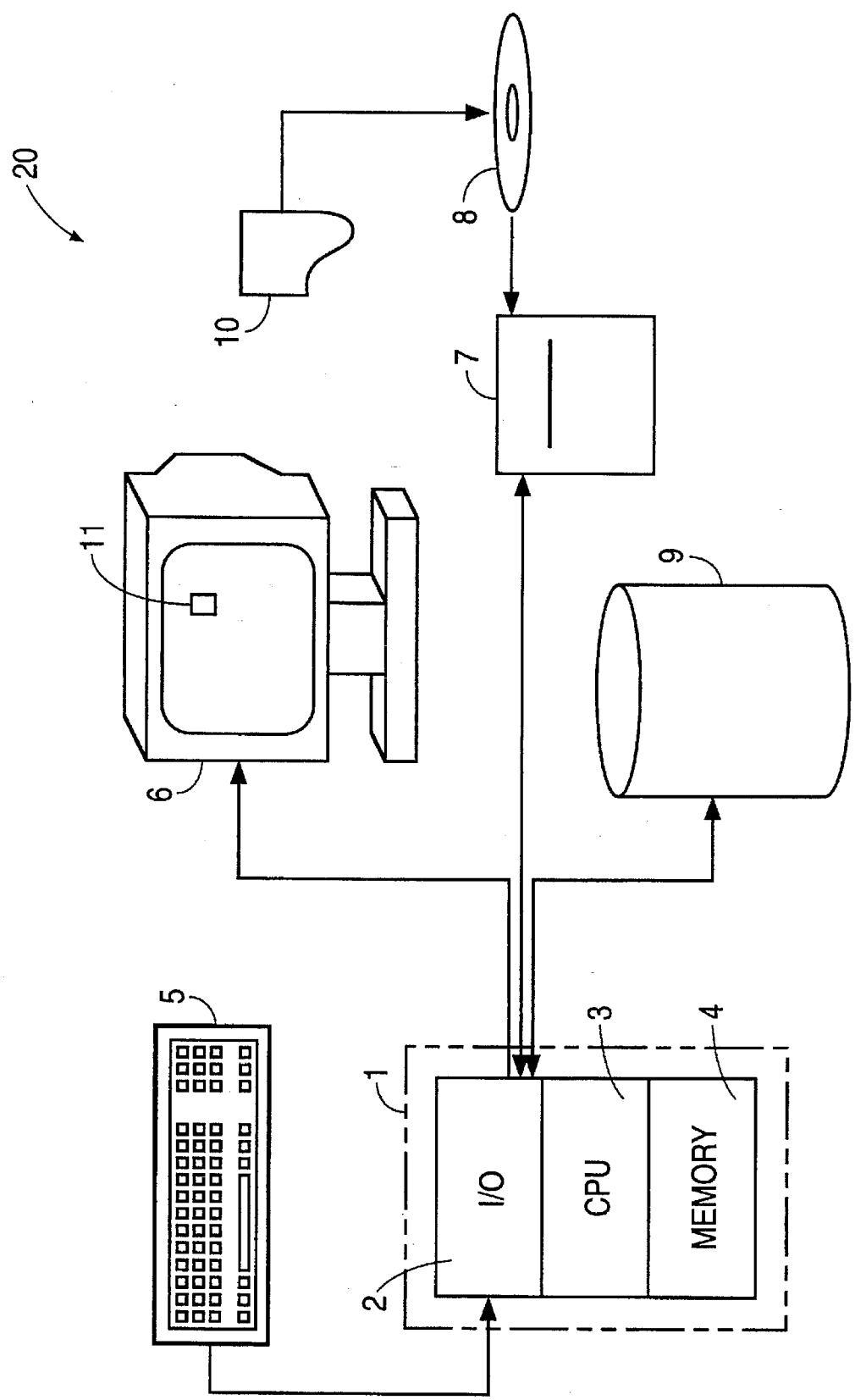
FIG. 1 illustrates an exemplary computer system.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes solutions to problems which are encountered in production and testing of a localized version of a computer program product. A process for localizing a target computer program product is disclosed which makes use of a Localization Kit containing tools to automatically guide a user in the steps necessary to localize the target product and to automate and control the process of assembly and test of the localized version of the product. The disclosed apparatus and process permits a computer program product manufacturer to contract with a local Software Developer or Distributor to develop a localized version of a target computer program product by supplying the Developer or Distributor with a copy of a binary version of the target computer program (typically on a CD-ROM) and a Localization Kit (also typically on a CD-ROM). The target computer program manufacturer thereby minimizes the risk of loss of intellectual property in the target computer program by not having to provide source code of the program. The target computer program manufacturer also minimizes his costs of rapidly producing localized versions of his target computer program for any country in the world by providing the Localization Kit to guide the local developer in the process, insuring consistent localizations and secure assembly of the localized portions of the product with the portions of the target program product that does not require modification. The implementation of the invention, while it may be used in any relevant context with any computer program product, is described in the context of a particular target computer program product for illustrative purposes. However, no specific knowledge of the illustrated system is required by those skilled in these arts to understand and implement the process and system described in this disclosure.

Operating Environment

The environment in which the present invention is used encompasses the general distributed computing system, wherein general purpose computers, workstations, or personal computers are connected via communication links of various types, in a client-server arrangement, wherein programs and data, many in the form of objects, are made available and shared by various members of the system for execution and access by other members of the system. Some of the elements of a general purpose workstation computer 20 are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. A computer display icon 11 is shown on the display unit 6. Similar workstations may be connected by a communications path to form a distributed computer system.

The Preferred Embodiment

Figure 2:
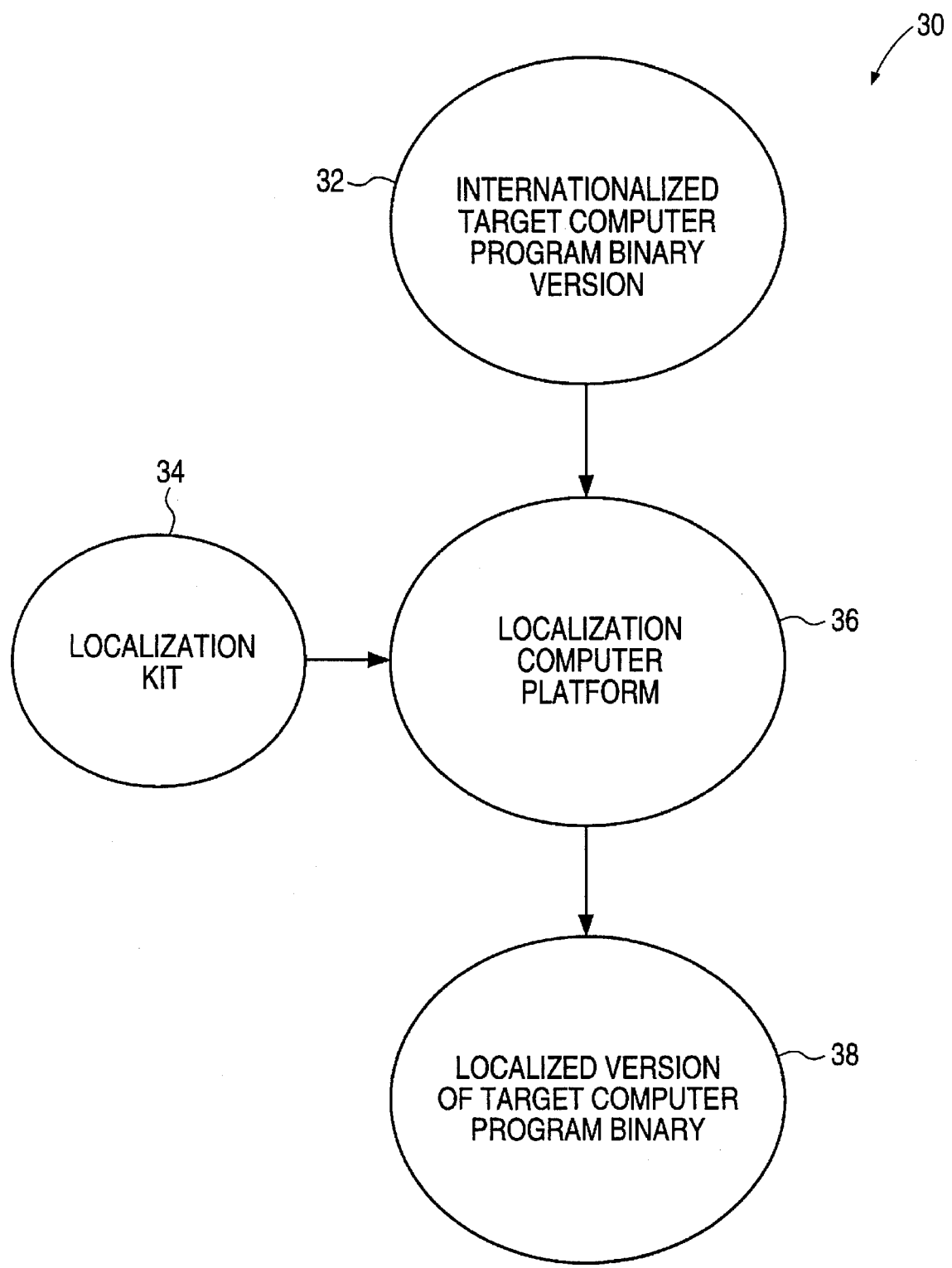
FIG. 2 illustrates the general localization process.
Figure 3:
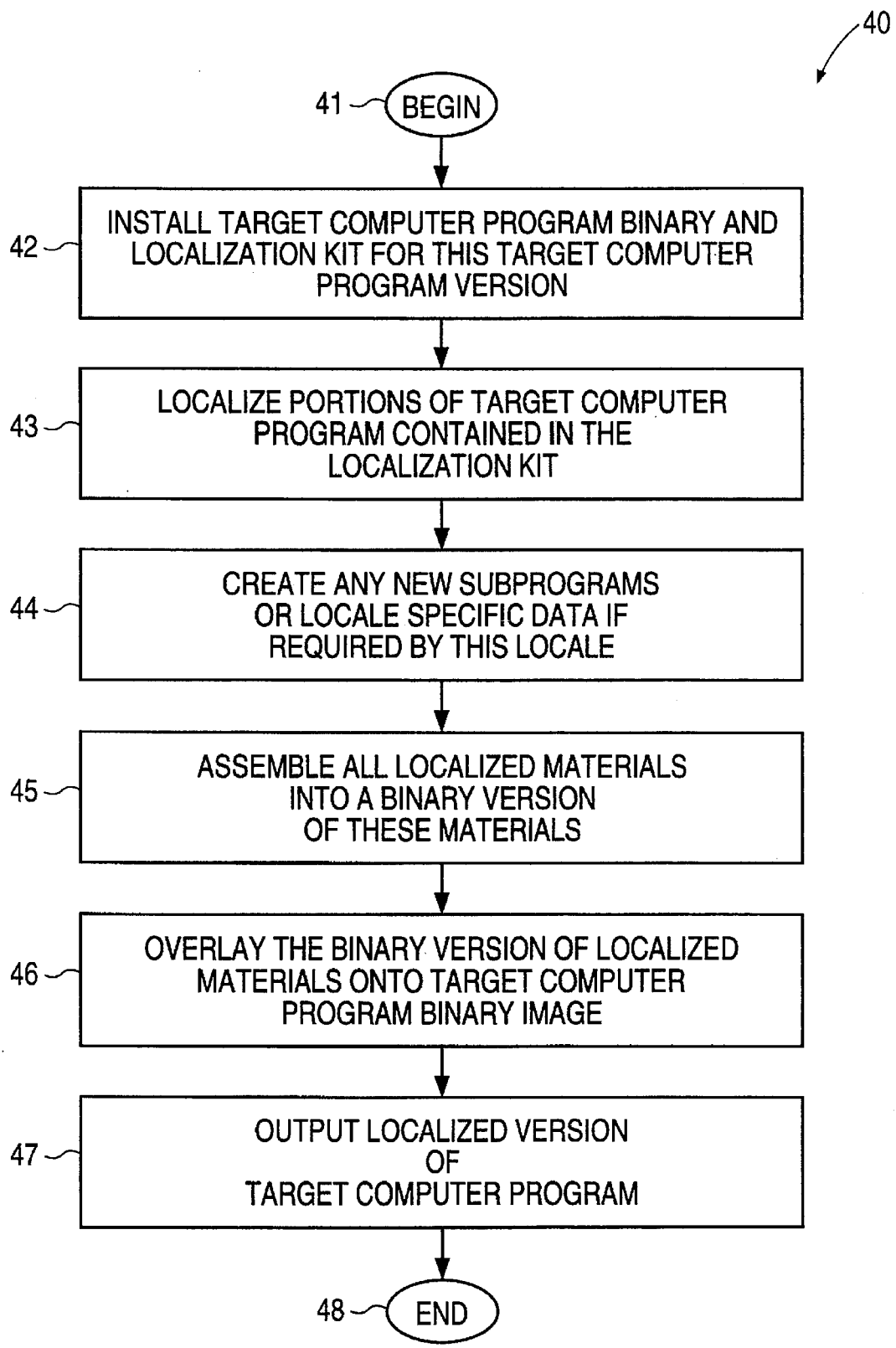
FIG. 3 illustrates a block diagram of the high level activities of the localization process of the present invention.

The solution to the problem of efficiently and consistently creating localized versions of computer program products, provided by the present invention, is to provide a Localization Kit to guide and control the process of localizing a target computer program. Referring to FIG. 2 the general localization system 30 shows an internationalized target computer program product in binary form 32 (this is generally in CD-ROM form), a Localization Kit 34 (which is also typically in CD-ROM form), a localization machine platform (typically a computer workstation) 36, and a localized version of the target computer program product binary 38. In a preferred embodiment, the localization machine platform must have the following minimum configuration, 1) SPARC-based system or x86-based system with a CD-ROM drive; 2) at least 24 Mbytes of system RAM memory; 3) at least 150 Mbytes of available disk space. (For additional configuration information related to an exemplary embodiment see Appendix A which is incorporated herein.) In the preferred embodiment, the original target computer program product 32 has been internationalized (as more fully described below with reference to FIG. 5). The target computer program product binary 32 is loaded into the localization machine platform 36. The localization kit 34 is then loaded into the localization machine platform 36, and guides the localization developer through the steps of localizing those portions of the target computer program which require localization. The localization kit 34 then combines the localized materials with the target computer program product binary 32 to produce the localized version of the target computer program product 38. Referring now to FIG. 3 a more detailed illustration of the invention 40 is shown. The process begins with the local developer/localizer installing on the computer system, the target computer program binary and the localization kit for the target computer program 42. Portions of the target computer program which are localizable are contained in this localization kit and the developer/localizer, guided by the tools in the localization kit, proceeds to localize the portions which he desires to localize 43. The localization kit also guides the developer/localizer in localizing some of the locale specific data (time, currency, sort order, etc.) directly in the image of the target computer program. As guided by the tools in the localization kit, the developer/localizer creates any new subprograms or specific data (such as any new character fonts and/or subprograms needed to deal with the specifics of the locale which may not already be available in the localization kit) if required by this locale 44. The developer/localizer then uses the localization kit tools to assemble all materials which have been localized into a binary version of these materials 45. The developer/localizer then, with the use of the localization kit tools, overlays the binary version of the localized materials onto the binary version of the target computer program 46 thereby producing a localized version of the target computer program product 47.

Figure 4:
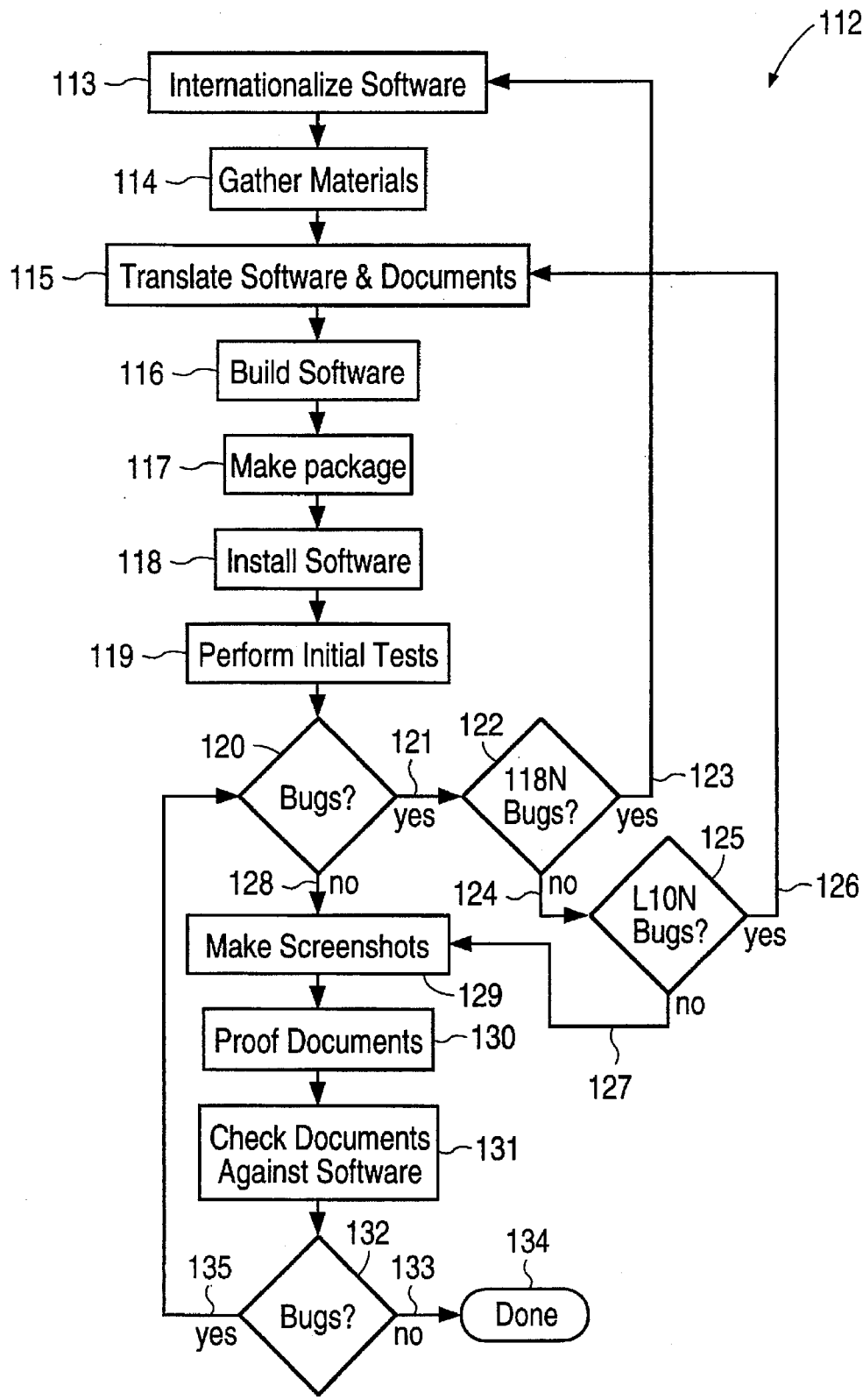
FIG. 4 illustrates a detailed block diagram of the general localization process.

This process of creating a localized version of an original program for use in a particular country or locale is a complicated activity which is now described in more detail as a basis for a more detailed description of the present invention. Turning now to FIG. 4 the overall localization process 112 is described. The process begins with a target computer program which is internationalized 113. Materials to assist in the localization process are gathered 114. This includes materials such as Software documentation that describes the software to be localized, general documentation on Internationalization and localization, etc. The internationalized target computer program and the localization kit, which contains portions of the target computer program which are localizable, are loaded into a computer and, guided by the tools in the localization kit, the localizable portions are localized 115. Then, as guided by certain tools in the localization kit, the localized portions are assembled into binary coded sections 116, and collected into binary coded packages 117 which are then overlaid onto the target computer program binary version thereby creating a localized version of the target computer program which is then installed in the computer 118. Test procedures contained in the localization kit are then used with the localized version of the target computer program 119, to find any obvious internationalization ("I18N") bugs 120, 122 or any localization ("L10N") bugs 125. If any bugs are found 123, 126 the process is repeated from either the internationalization step 113 or the localization step 115. If no bugs are attributable to either the internationalization procedure or the localization procedure are found 128, 127, the localized version of the target computer program is exercised once again and screen shots are made of the localized screens 129 for inclusion in hard copies of the user documentation to be subsequently printed by the developer/localizer. The associated documents which were localized (in step 115) are now proofread 130 and checked against the localized target computer program 131. Any bugs found in the documentation proof and check 130, 131 are corrected 135 and the process of proofing and checking repeated. If the documentation is acceptably clean 133 the localization process is complete 134.

Figure 5:
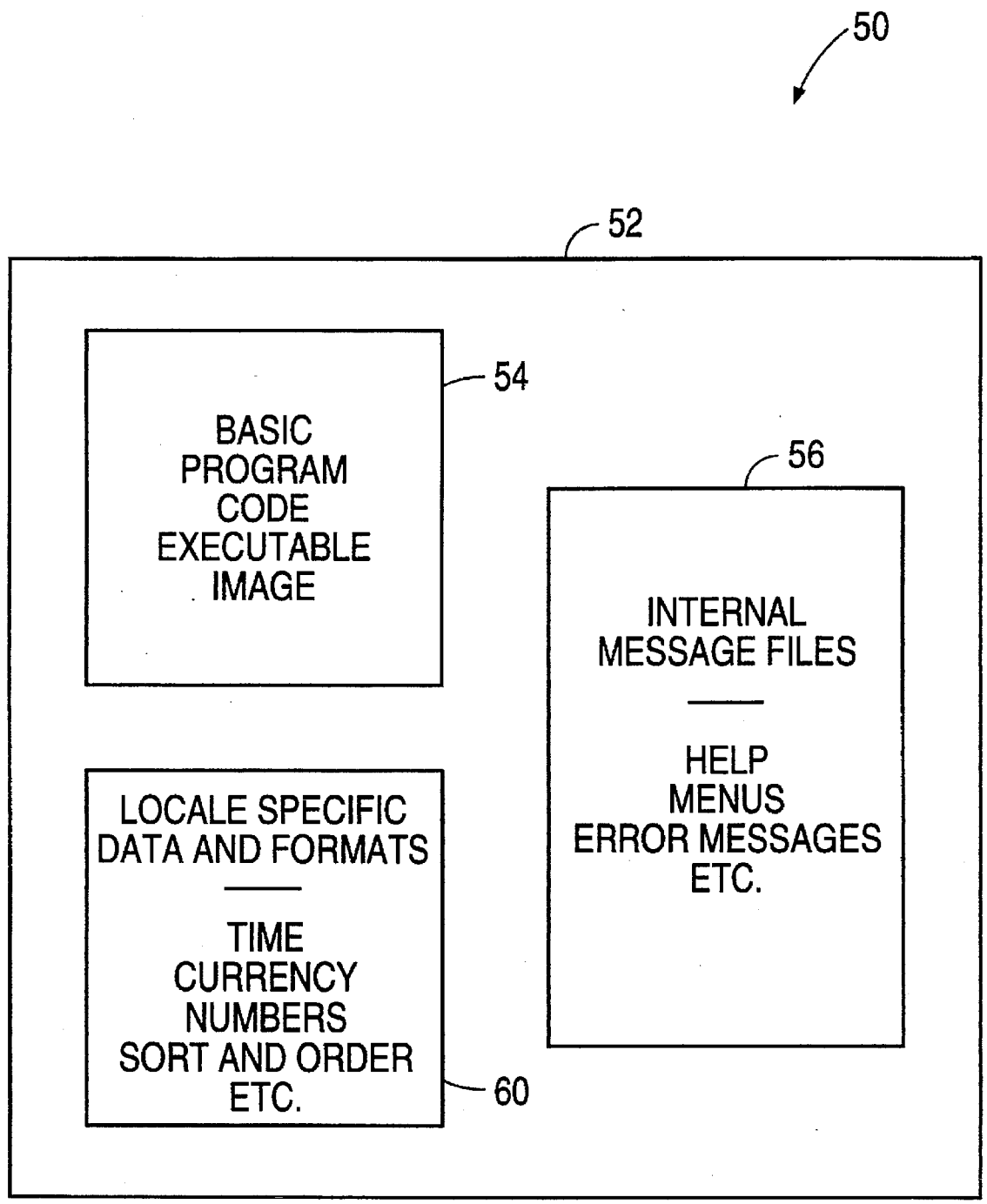
FIG. 5 illustrates an exemplary make-up of an Internationalized target computer program.

As indicated above, the computer assisted localization apparatus and process of the present invention is made easily usable by first internationalizing the target computer program. Internationalization is a process of coding and compiling the target computer program in such a way that separates the executable image and all printable and displayable interfaces that the user sees. These message strings and formatting information are kept in a message database which may also contain information to format dates, time and currency according to locale specific conditions. The main goal of internationalization is to have one executable image that can run everywhere, with any locale specific data contained in separate data bases. Such internationalized software is designated Level 1 compliant if it is "8-bit clean" (it does not use the most significant bit because ASCII characters only use 7 bits at most) and can therefore use the ISO 8859-1 (also called ISO Latin-1) codeset. Level 2 compliant software makes the formatting and collation methods locale sensitive by leaving the format design and sorting order to the localization center in a particular country locale. Level 3 compliant software segregates the user-visible text, such as help text, error messages, button labels, menu items, property sheets, text in icons, etc., into a separate message file which is indexed by string contents or by number or some other similar method. Level 4 compliant software provides support for East Asian languages, which often require multi-byte codesets, such as the Extended UNIX Code (EUC) for example. Accordingly, in the preferred embodiment of the present invention, the localization kit can accommodate target computer programs that are at least Level 3 compliant. Referring now to FIG. 5 an exemplary internationalized target computer program 50 is depicted. An internationalized target computer program binary 52 is shown, with separated sections or portions of the binary product. These portions include the basic program code executable image (internationalized for single and multi-byte locales) 54; a separate portion containing the message database 56; and a separate portion containing locale data and formats (i.e. time, currency, sort order, etc.) 60. Also included in the most preferred target computer program is an executable image containing enabling hooks to make it easy to add any new or required subprograms (required by a specific locale). User documentation specifically tied to the current release of the target computer program are typically contained on a separate CD-ROM or in hard copy. Those skilled in the art will recognize the possibility of an innumerable number of ways of preparing a specific internationalized version of a target computer program which generally meets the necessary segmentation requirements.

Figure 6:
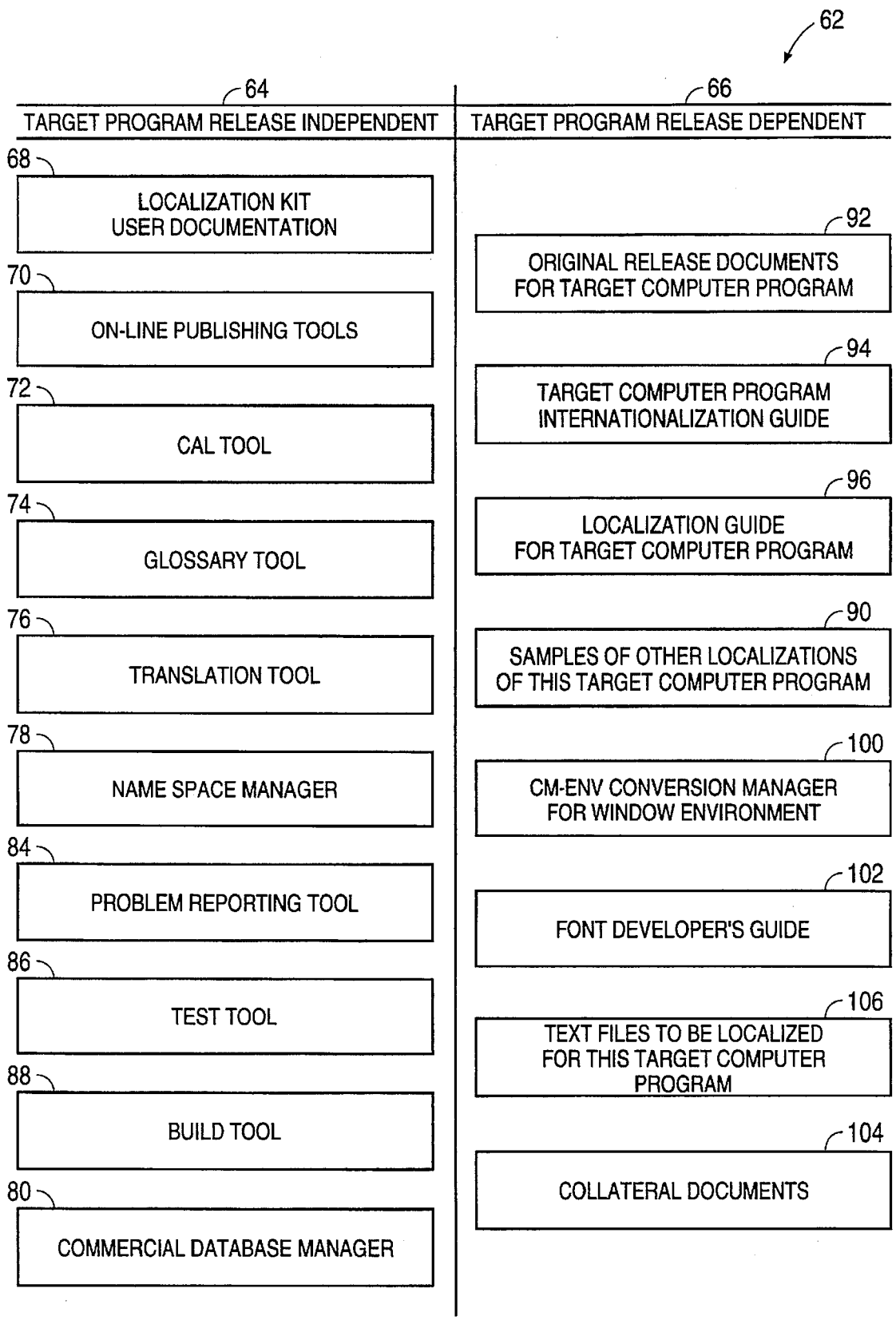
FIG. 6 illustrates the typical components of a localization kit.

An internationalized target computer program of the type described above provides the environment to enable the localization kit of the present invention to be used efficiently. Referring now to FIG. 6, an exemplary make-up of the localization kit 62 is depicted. The localization kit 62 is shown having two sections; a section containing items which are independent of the particular release of a target computer program 64, and a section which contains items which are dependent on the particular release of a target computer program 66. It is therefore evident that a particular localization kit as described in the present invention is assembled only after a particular version of a target computer program is completed, and that the localization kit includes some specific files either taken from the target computer program (such as data indicating locations of hooks, beginning locations of portions containing the message and other files, etc.), or relating to data in the target computer program (such as source code versions of messages, text data and documentation) or other release specific documents such as specific release dependent user and localization guides, etc. Referring again to FIG. 6, a make-up of an exemplary localization kit is described. The target computer program release independent portion 64 includes: localization kit user documentation 68 which is independent of any particular target program; on-line publishing tools 70 (such as Framemaker, Answerbook, etc.); a computer aided localization tool ("CALtool") 72; a Glossary tool 74, with an associated data base manager 80; a Text Translation tool 76; a name space manager to coordinate the location of various files and data between the tools of the localization kit 78; a testing and performance tool 86; a problem reporting tool 84; certification tools 87; and build and packaging tools 88. The target computer program release dependent portion 66 includes: original target computer program release documents such as a sample release schedule, and other information for the localizer 92; a copy of the internationalization guide for the target computer program 94; a copy of the localization guide for the target computer program 96; a language engine for the particular window manager used by the target computer program 100; a font developers guide 102; text files to be localized for the target computer program 106; collateral documents 104 (such as, packaging labels, etc., which also must be localized); and samples of other localizations of the target computer program 90 if any are available at the time the kit was built. Appendix B which is incorporated herein, describes Localization Kit contents for several exemplary versions.

Figure 7:
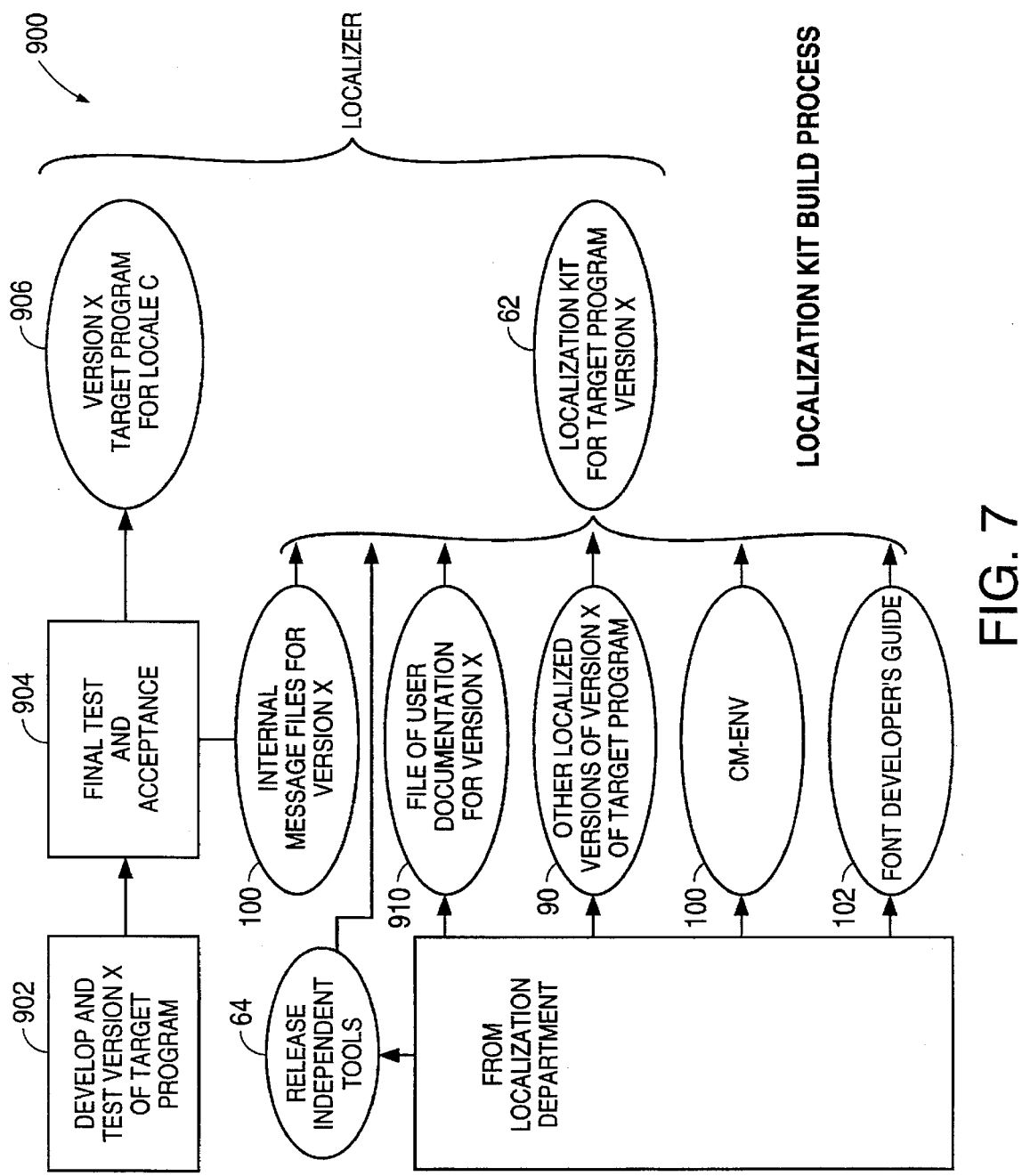
FIG. 7 illustrates the relationship of the general components of the Localization Kit.

The localization kit for a particular release of a target computer program 900 is shown in FIG. 7. The particular release of the target computer program goes through a normal development and test process 902, a final acceptance and test process 904 and thereafter a binary version of the target computer program is made 906. As an example, this is the process followed by Sun Microsystems, Inc. in the release of its operating system called Solaris® version 2.3. (SOLARIS is a registered trademark of Sun Microsystems, Inc.) After the target computer program has been accepted, a program is run against this target computer program to extract a file containing the message files 100. The localization department of the target program manufacturer collects the release independent localization tools 64, files of user documentation for the particular version of the target program 910, samples of other localized versions of the target program if any 90, the language engine for the particular windows environment used in the target program 100, and a font developers guide for this release of the target program 102 and with the message files for this release of the target program 100 creates a localization kit 62 for this release of the target program. It is this localization kit 62 (typically in CD-ROM form) and the binary version of the target computer program (also typically in CD-ROM form) which are delivered to a developer/localizer in this or another country to use in developing localized versions of the target computer program. Those skilled in the art will recognize that a particular localization kit may be constructed in any number of ways to run on any kind of computer platform and may contain a variable number of files to assist the localizer without violating the intent or bounds of the present invention.

Figure 8:
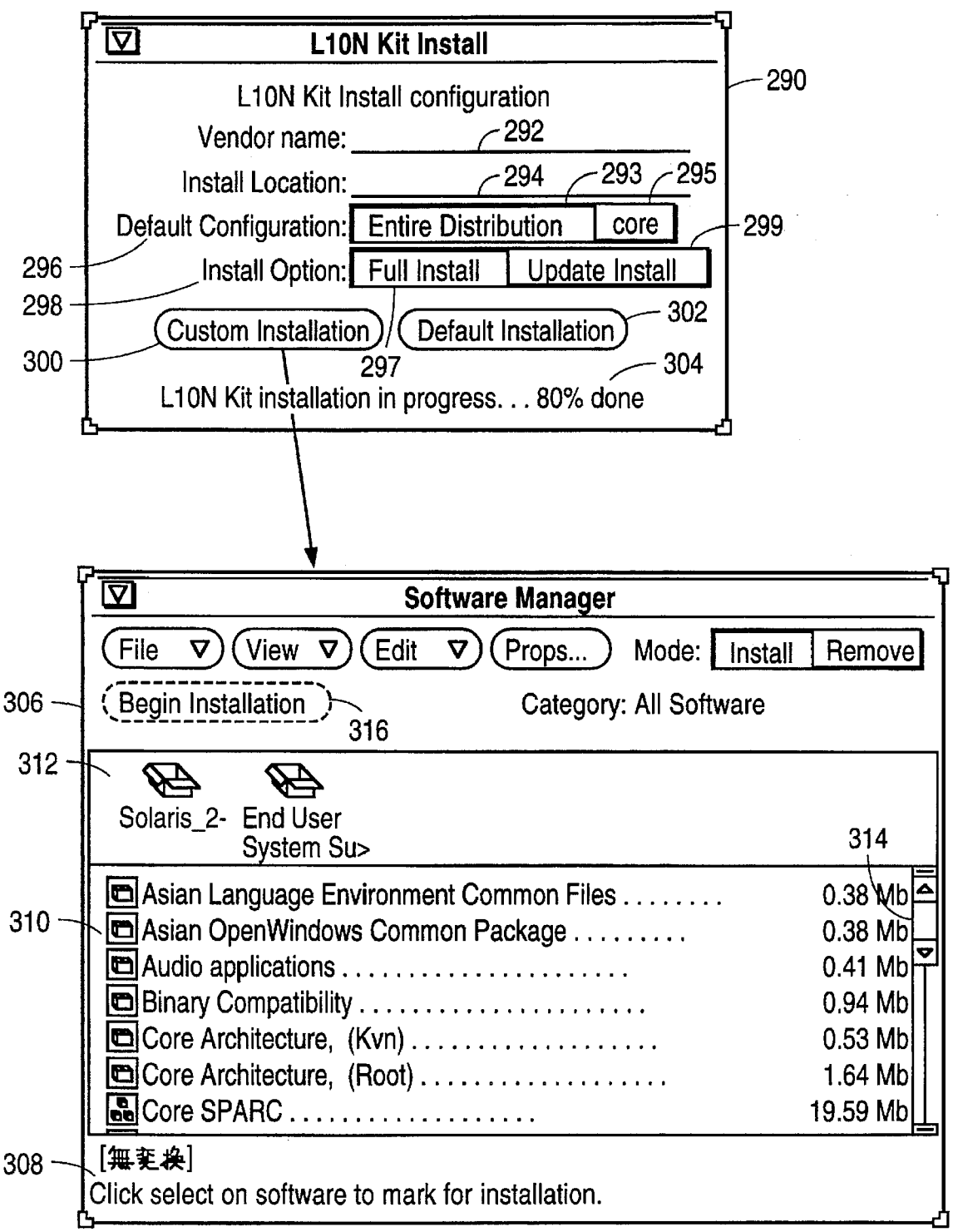
FIG. 8 illustrates the graphical user interface ("GUI") of the EZInstall function.
Figure 9:
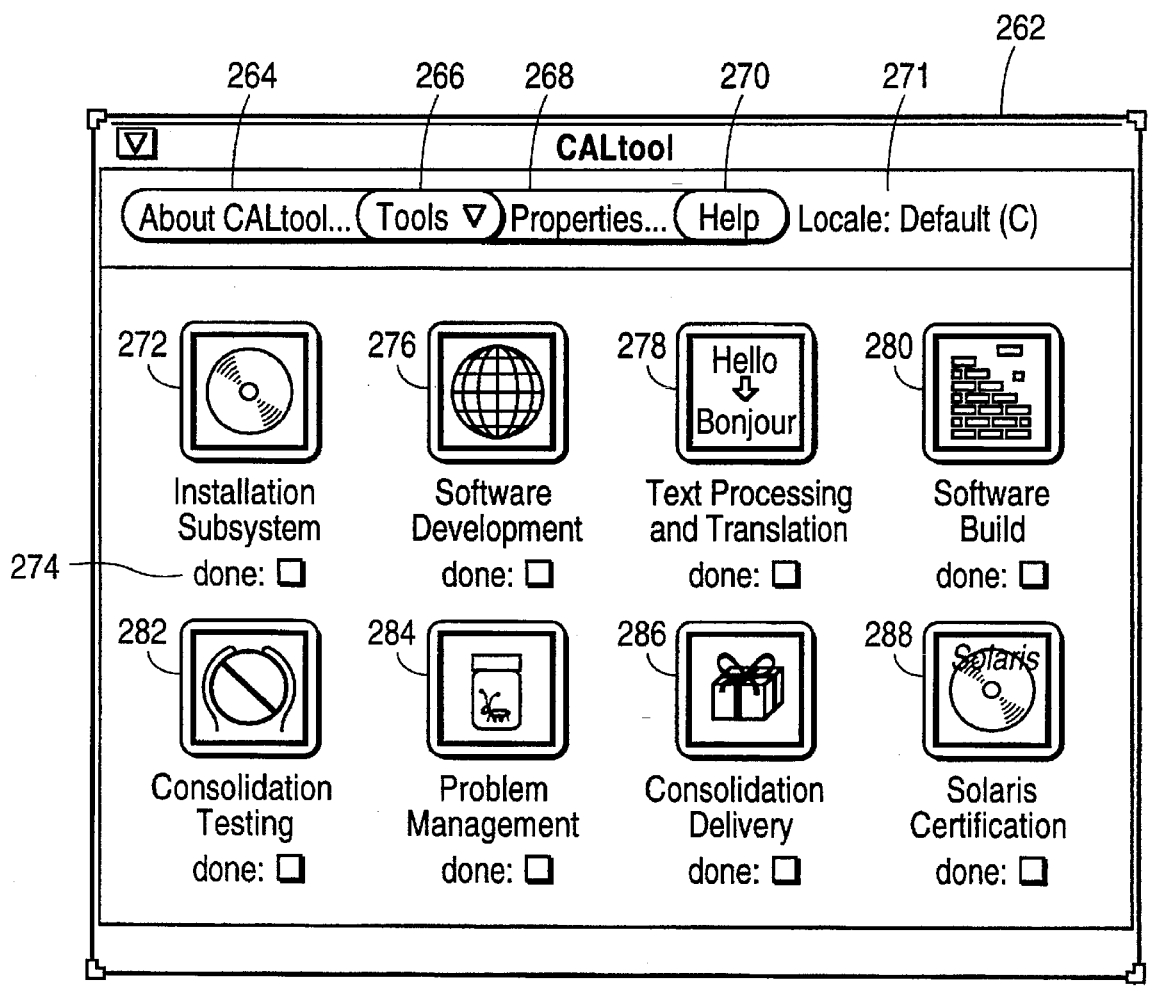
FIG. 9 illustrates the graphical user interface ("GUI") of the CALtool function.

In a preferred embodiment, the target computer program is loaded onto a computer, and then the localization kit is loaded. All or part of the localization kit may be loaded depending on the memory and disk space available on the particular computer platform being used. A command "L10N" is invoked by the user in the "root" mode which brings up the L10N kit install window 290 shown in FIG. 8. Referring now to FIG. 8, the L10N kit install window 290 contains a space for the localizer to enter his/her company name 292, and the install location on the hard disk 294 ("/opt/l10n-kit", for example). The "Default Configuration:" section 296 allows the localizer to select a load of either the entire contents of the kit (by clicking on "Entire distribution" 293) or a partial load (by clicking on "core" 295). Selecting the "core" 295 option causes the load of only the basic localization tools, the help documents and the message files to be localized. Appendix C, which is incorporated herein, contains examples of Kit file packages for several target computer programs, showing the items that would be loaded under the "Core" option 295 in each case. The localizer then selects either "full install" 297 or "update install" 299 in the "Install option" 298 line. Full Install 297 is used for initial kit installation, and "update install" 299 is used for installation of upgrades. Next the localizer can elect (by clicking on) either "Custom Installation" 300 or "Default Installation" 302. The "Default Installation" 302 election causes the entire "Default Configuration" 296 selected to be loaded. The localizer may then select the "Custom Installation" 300 button and a "Software manager" window 306 will appear allowing the localizer to select the individual software packages to be loaded 310 and then to execute an install of the packages indicated by clicking on the "Begin Installation" button 316. After a successful install, the Localizer will bring up a window showing the graphical user interface ("GUI") for the computer assisted localization tool ("CALtool") contained in the localization kit. This CALtool GUI is used to guide the localizer through the localization process and is depicted in FIG. 9. Referring now to FIG. 9 the GUI window 262 is shown with buttons which read "About CALtool" 264; "Tools" 266; "Properties" 268 and "Help" 270. The GUI window 262 also contains icons labeled as follows: "Installation subsystem" 272; "Software Development" 276; "Text Processing and Translation" 278; "Software Build" 180; "Consolidation Testing" 282; "Problem Management" 284; "Consolidation Delivery" 286 and "Solaris Certification" 288. The localizer clicks on these icons to obtain further instructions and assistance in the localization process as will be more fully described below. Clicking on an icon either brings up other windows to guide the process or brings up specific "help documentation" that tells the localizer what to do next. Each of these icons has a small button labeled "done" 274 under it so that the localizer can check this button if he has finished a particular task. In a alternative embodiment, several localizer/users may be working on the localization process at the same time from a number of workstations, for example, each one translating a part of a user document. If one of these localizer/users tries to mark the task done, the CALtool will not let him show a check mark in the "done" box 274 if the CALtool knows the task is incomplete and/or that others are still working on it.

Figure 10:
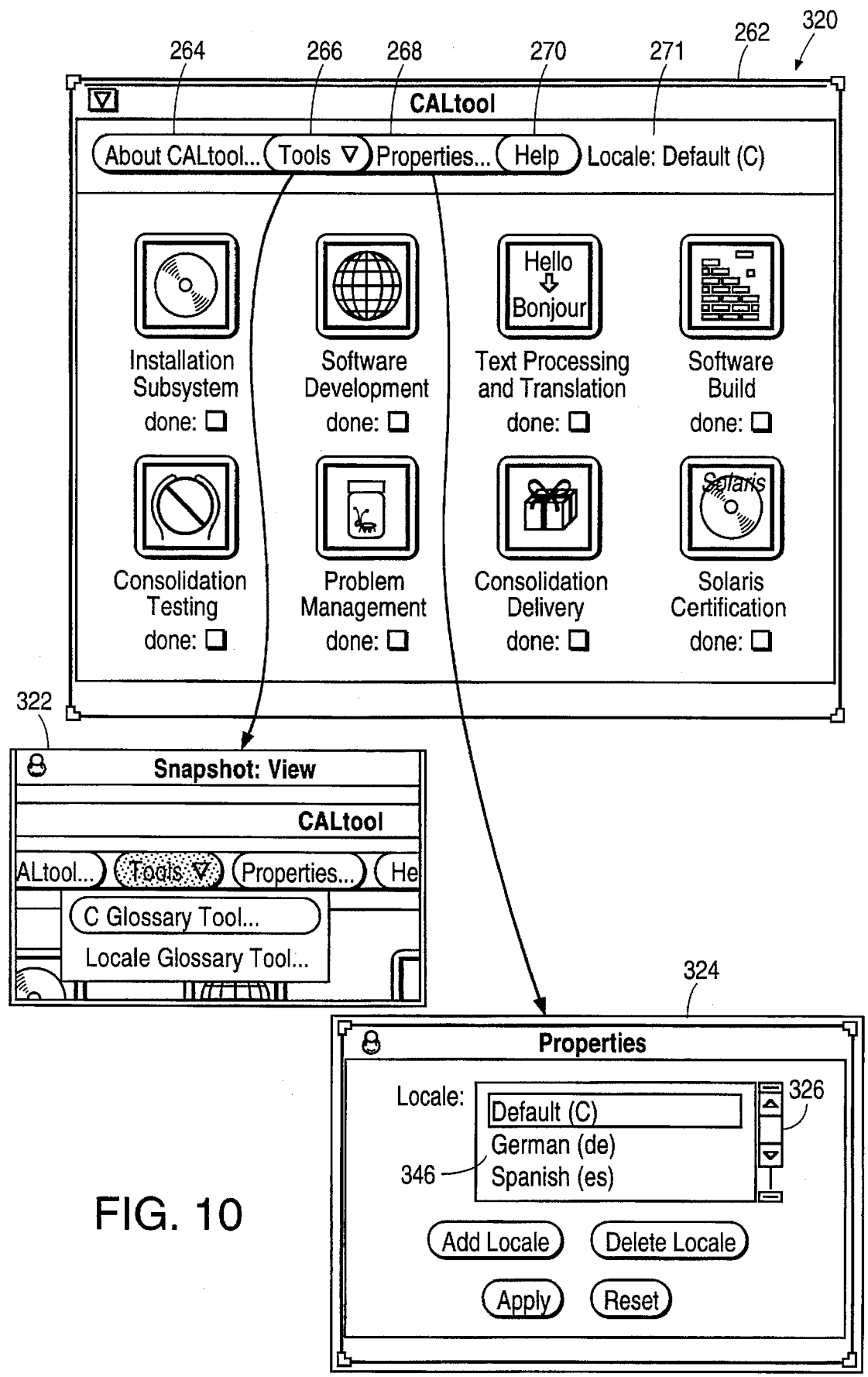
FIG. 10 illustrates additional features of the graphical user interface ("GUI") of the CALtool.
Figure 11:
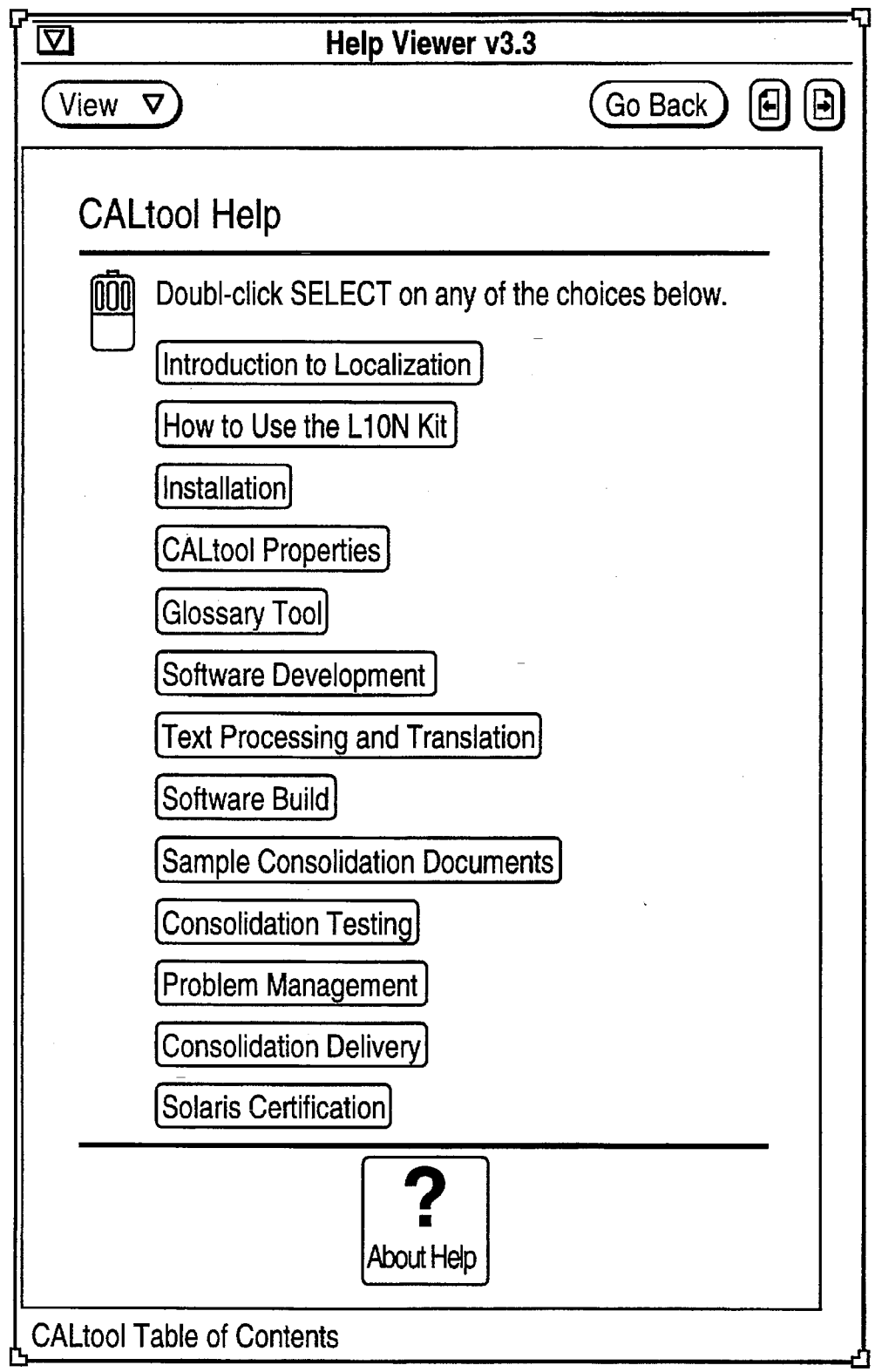
FIG. 11 illustrates the Help Documentation Screen.

To begin the localization process the user sets the locale environment settings for this particular localization by clicking on the "properties" button (268 in FIG. 10) on the CALtool GUI 262. The default setting is "locale C" for the English language ("U.S. version") and is shown in the "Locale" box 271 in FIGS. 9 and 10. Referring to FIG. 10, placing the pointer on the "Properties" button 268 and depressing the left mouse button ("clicking on" the properties button), causes a "properties" window 324 to appear. The localizer/user then using the "locale" scrolling bar 326 can bring-up a table of languages/locales 346 and select the one which he chooses for this localization task. This sets the Locale Glossary and Translation Assistant automatically to the new locale selected. (The Glossary and Translation tools are explained in more detail below.) The "About CALtool" button 264 brings up a window containing information showing the version of CALtool, the target computer program products it supports and the copyright notice for the current version. The "Help" button 270 brings up a window showing the entire contents of the CALtool help documentation (see FIG. 11) to permit the localizer/user to read the entire set of instructions at this time if he desires.

Figure 12A:
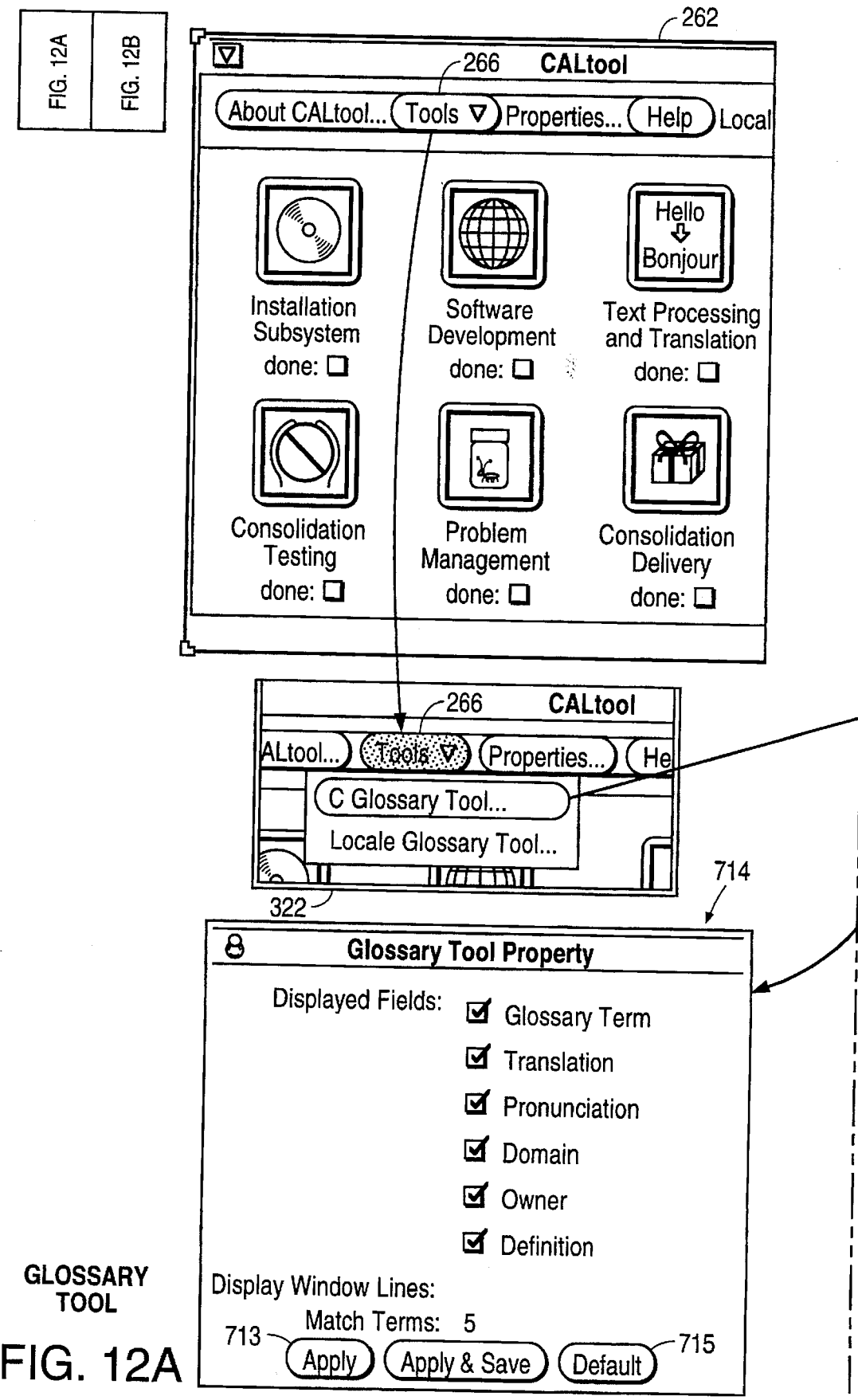
FIG. 12 illustrates the Glossary Tool GUIs.
Figure 12B:
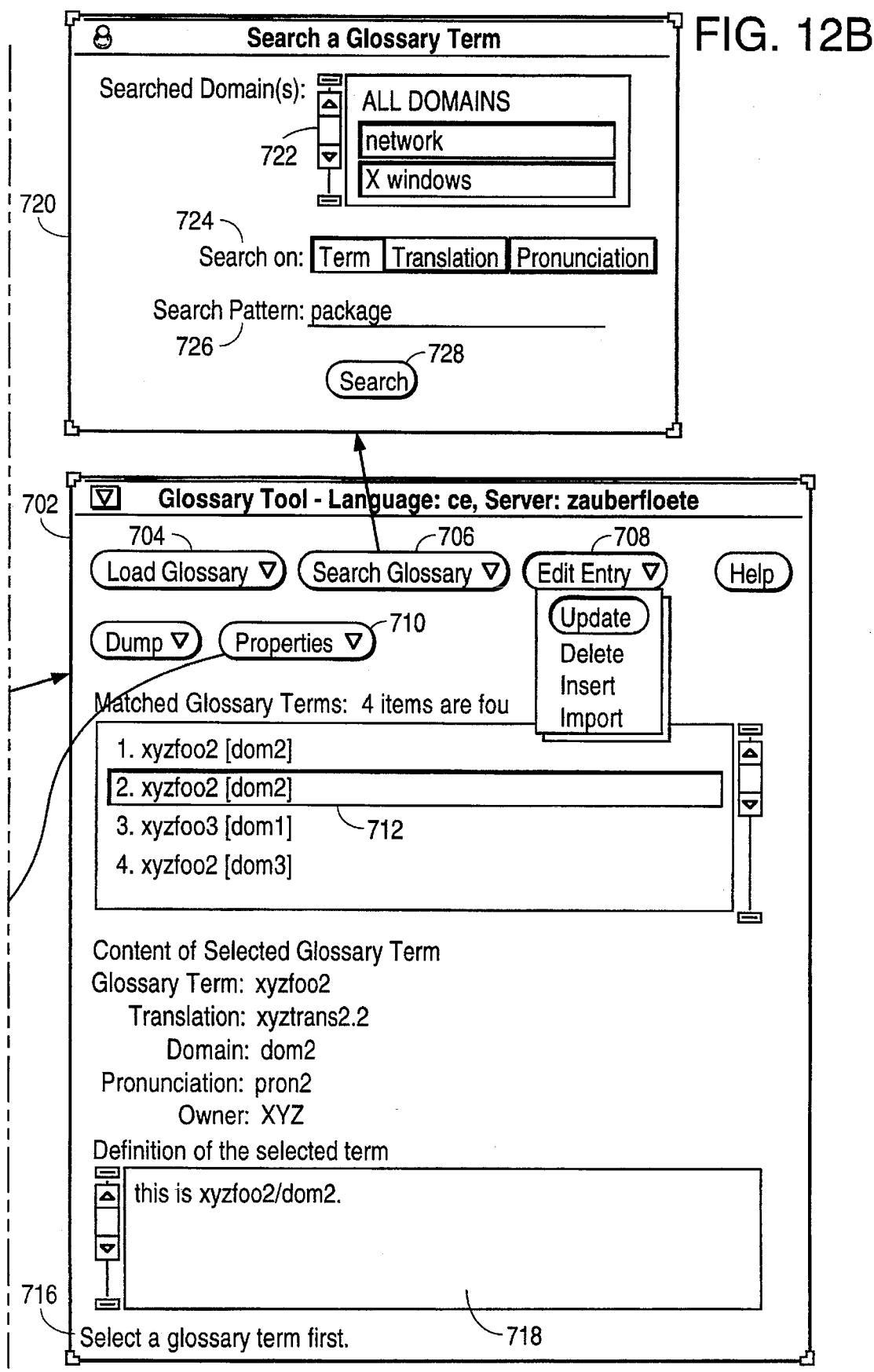

Having set the appropriate environment parameters, the localizer/user now continues with the localization process, being guided by the CALtool GUI (FIG. 9) and the related "Help" documentation. The localizer/user would normally be directed to review the glossary of technical terms for his/her own education as well as to add any new translations which may be necessary for the locale of the present localization effort. After creating an updated glossary set, with correct translations of technical terms, localizers can use a consistent set of translations throughout the document set whenever similar terms are used thus saving time and cost in the localization process. The Glossary tool can be selected from the "Tools" button (266 on FIG. 9). The Glossary tool is selected to find a translation, to edit a translation or to delete a translation. The Glossary tool, like all other tools in the present invention, are described in the on-line "Help" documentation contained within the invention. Referring now to FIG. 12 the Glossary Tool operation is described. In FIG. 12 a portion of the CALtool GUI 262 is depicted, showing the "Tools" button 266, which when accessed displays a pull-down menu 322 in which the Glossary tool can be selected. When the Glossary tool selection in the pull-down menu 322 is made, the Glossary tool window 702 appears. The localizer/user will access the "Load Glossary" button 704 first. This will result in a pull-down menu from which the localizer/user earl select the load of a local glossary (meaning the glossary from the localizer's own server), or a remote glossary (meaning one which is located on another server). If the "use remote glossary" selection is made, another pop-up window will appear requiring the localizer/user to enter the name of the remote server and then execute a load button. Having loaded the desired glossary file, the localizer continues on the Glossary tool window 702. The localizer can set the properties of the displayed glossary term by clicking on the "Properties" button 710 which brings up the "Glossary Tool Property" window 714. In this window the localizer can click on the "Default" button 715 to display all fields and display a maximum of 5 matching terms. Otherwise the localizer/user can click on the individual fields to add (select) or remove (deselect) a check mark, and by changing the number of terms to be displayed. Clicking on the "Apply" button 713 saves the selections. The localizer/user can now search the glossary by clicking on the "Search glossary" button 706 which brings up a "Search Glossary Term" window 720. On this window the localizer/user can select the domain 722 to be searched, the search pattern 726 by entering the search argument, and can select the search for the translation of an English argument ("Term" in box "Search on" 724), or the search for an English translation of a non-English argument ("Translation" in the box "Search on" 724), or he can search on a phonetic likeness of the search argument ("Pronunciation" in the box "Search on" 724). If no exact matches of the search term are found, the Glossary Tool will display a pop-up window asking if the user would like to see approximate matches. The "Edit Entry" button 708 provides a pull-down menu directing the user to other windows which support "Update" (changing an existing entry), "Delete" (deleting an existing entry), "Insert" (adding a new entry) and "Import" (adding a file containing entries). The Glossary Data Base is managed by a data base manager. In the preferred embodiment a Sun developed data base engine is used but any commercial DBMS can be used. See FIG. 13 for a depiction of the Glossary data base system.

Figure 14B:
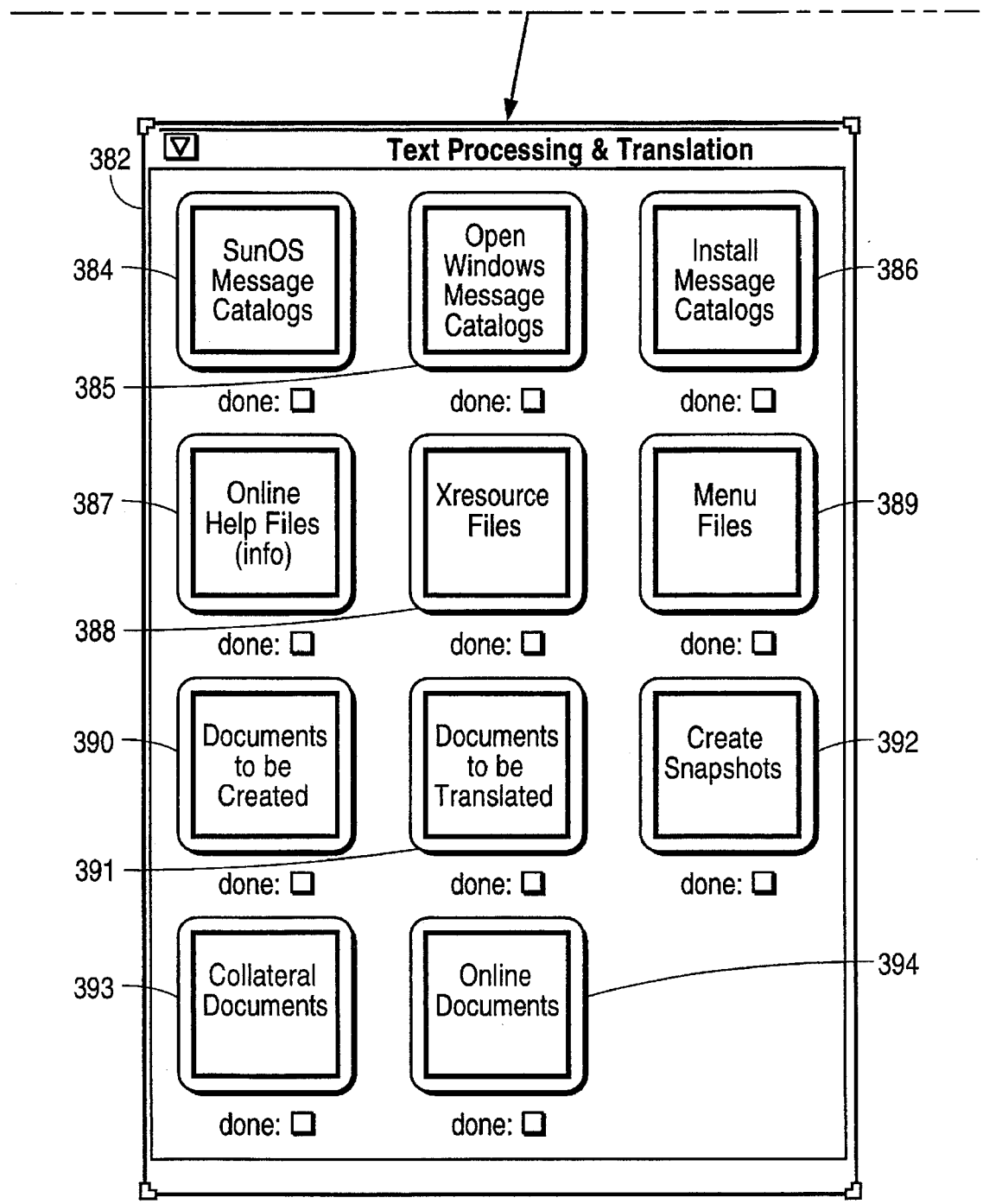
FIG. 14 illustrates the Text Processing & Translation window.
Figure 15:
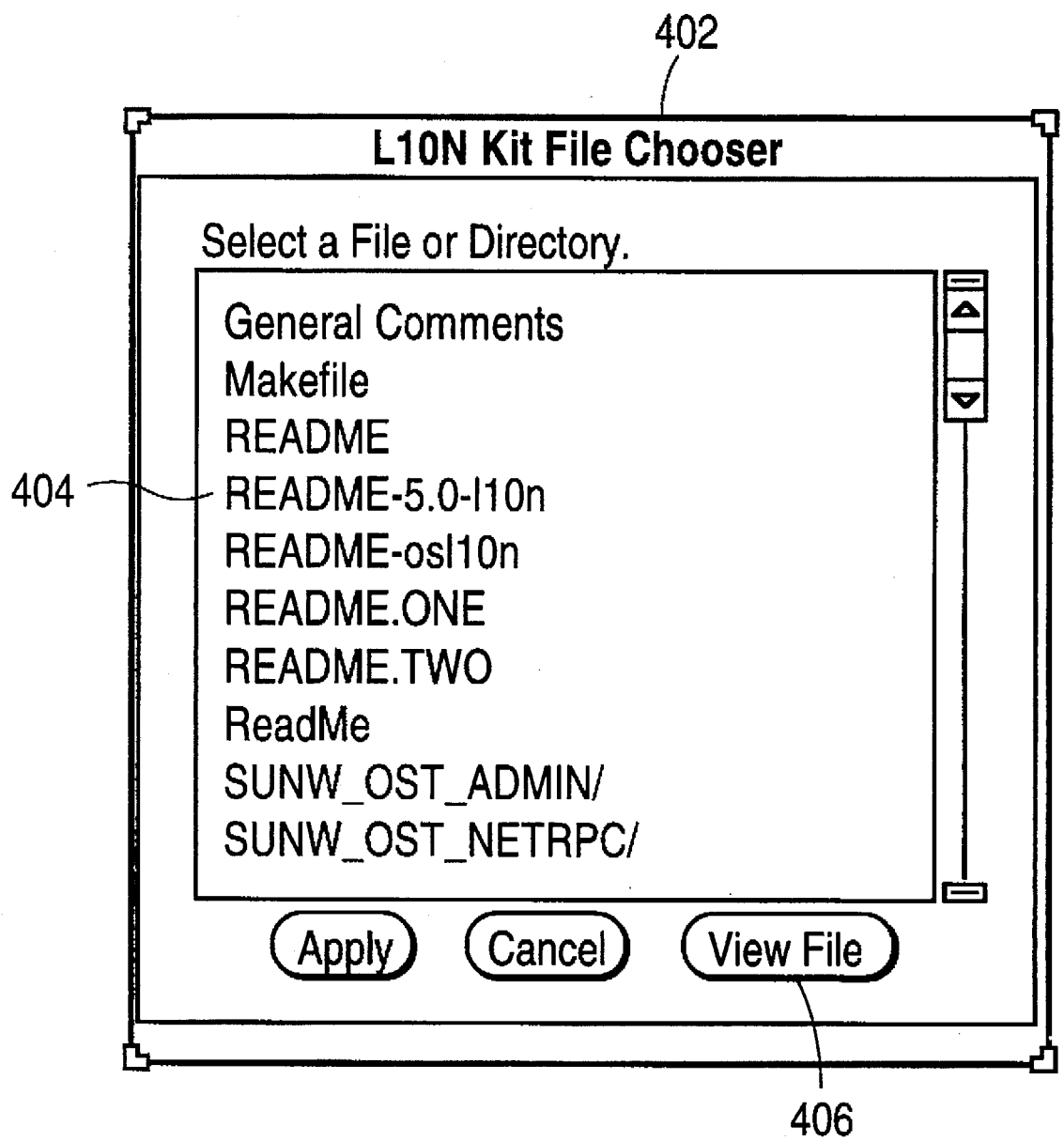
FIG. 15 illustrates L10N Kit File Chooser Window.

Having updated the Glossary the localizer/user is now guided by the CALtool to "Text Processing and Translation." Referring now to FIG. 14, when the localizer/user clicks on the CALtool GUI 262 button labeled "Text Processing and Translation" 280, the "Text Processing & Translation" window 382 appears. This window 382 contains icons 384 through 394 which guide the localizer/user in translating (i.e. localizing) the various kinds of documents, on-line messages, menus and text files which need to be localized for this release of the target computer program for this locale. In an exemplary embodiment the icons names are made specific to the target product being localized, for example, icon 384 is labeled "SunOS Message Catalogs" where SunOS is the operating system portion of the product SOLARIS which in this example is the target program. Icons 384 through 389 refer to different kinds of internal text messages. Clicking on any one of these icons brings up a LION File Chooser window similar to that shown in FIG. 15. The contents of a particular File Chooser window 402 is related to the type of message indicated on the icon 384 through 398 which was chosen. Selecting an entry 404 in the File Chooser window 402 and then clicking on the "view file" button 406 on the File Chooser window 402 brings up the particular text selected, which is read-only for information purposes. The localizer/user works his/her way through each of these files for each of the icons (384 through 389) in the "Text Processing & Translation" window 382. Icons 390 through 393 in the "Text Processing & Translation" window 382 relate to other types of documents which must be created as part of the localization process. Icon 394 in the "Text Processing & Translation" window 382 relates to on-line documents for this locale if any, and clicking on this icon 394 will bring up a "L10N File Chooser" window also. Clicking on the icons 390 through 393 brings up the "Help" documentation for the particular type of activity/document to guide the localizer/user through the necessary activities of creating and storing the required new documentation. The L10N File Chooser will lead the Localizer/user through selections of directories, if necessary, to reach the actual files. If a file for translation, other than a document file is selected, the Translation Assistant (see FIG. 22) is invoked, reading in the contents of the file and showing any translations which have been done to date.

Figure 22A:
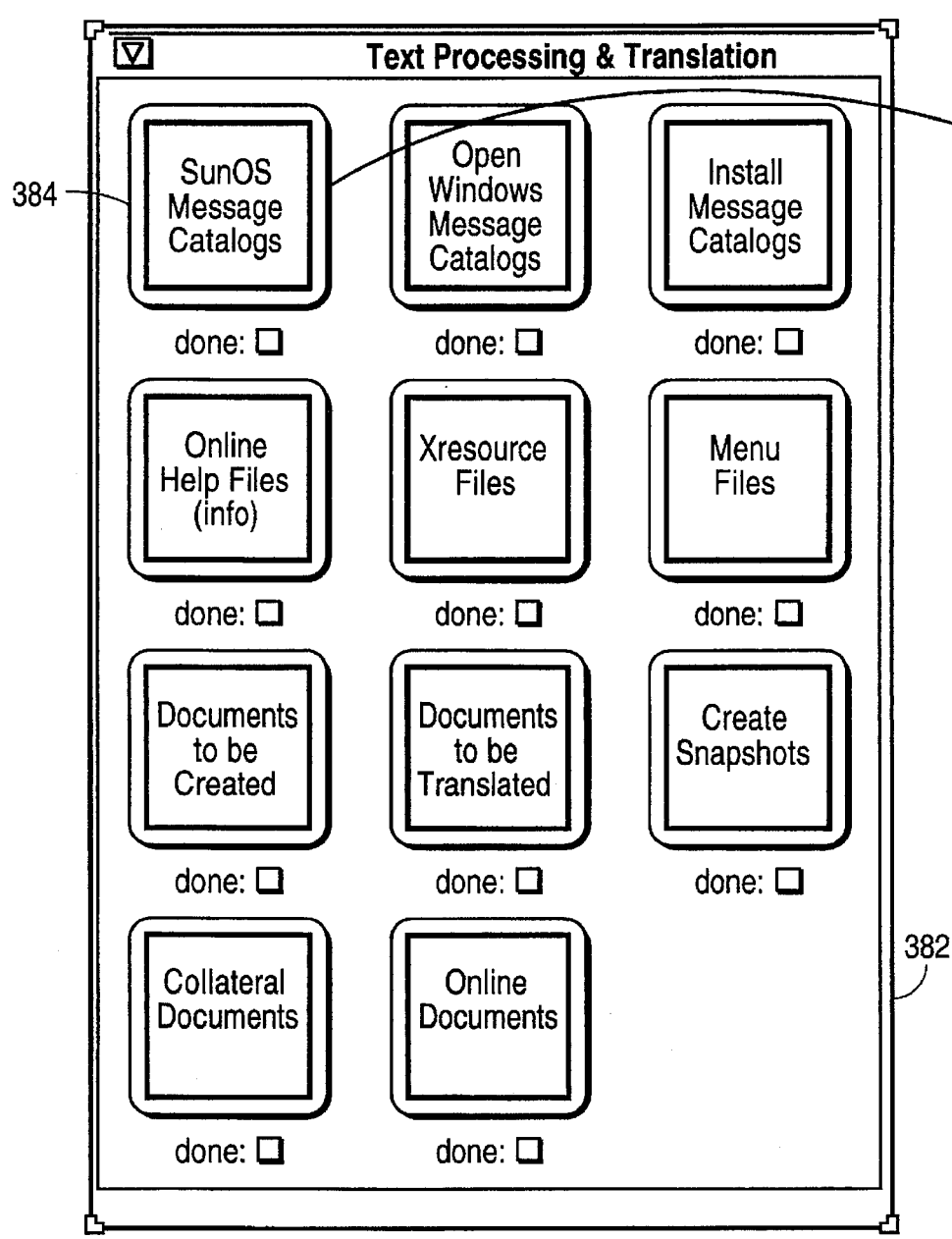
FIG. 22 illustrates the Translation Assistant window.
Figure 22C:
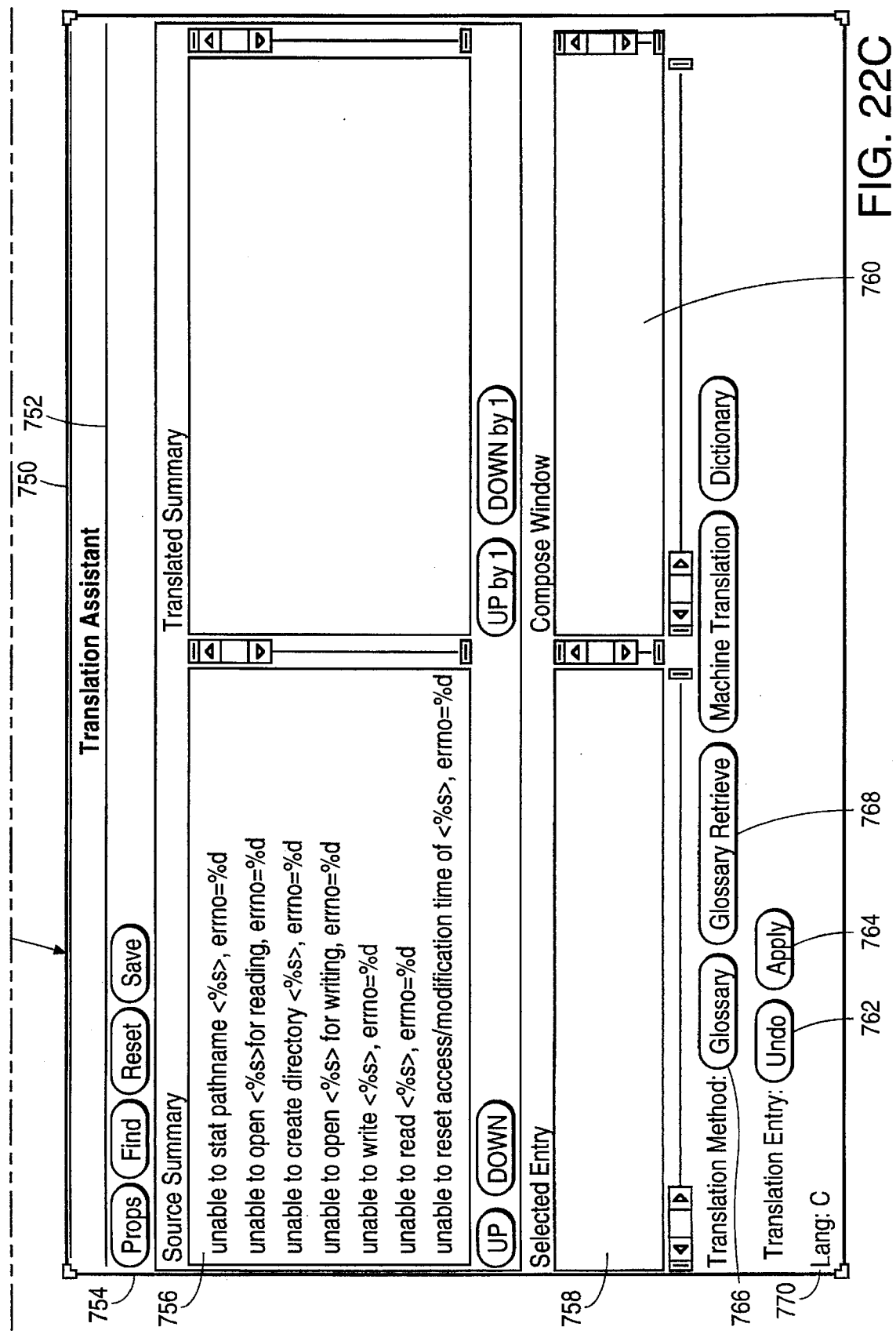

Referring now to FIG. 22, the Text Processing & Translation GUI 382, the L10N Kit File Chooser 402 and the Translation Assistant GUI 750 are depicted. The Translation Assistant GUI 750 contains a "Source Summary" window section 754, a "Translated Summary" window section 752, a "Selected Window" section 758, a "Compose Window" section 760, and buttons for Glossary 766, Glossary Retrieve 768, Undo 762 and Apply 764. Finally, the locale which has been selected is indicated at the bottom left of the window 770. When one of the icons on the Text Processing & Translation GUI 382 is selected (i.e. clicked on), for example the SunOS Message Catalog icon 384, this brings up the L10N Kit File Chooser window 402. To execute the translation process, the user selects a file name by clicking on it, for example file "oampkg.po" 403 and then clicks on the "Apply" button 405. This action brings up the Translation Assistant window 750 which will show the contents of the file "oampkg.po" 403 in the "Source Summary" window section 754, 756. If the locale which had been chosen is any locale other than "Locale C" (i.e. English), then the translation of the file will appear in the "Translated Summary" section 752. The localizer can then select each item in these windows in turn (i.e. 754, 752) by clicking on an item. This causes the item to appear in the "Selected Entry" window section 758, with the translation in the "Compose" window section 760. The Localizer can then highlight a word or phrase in the displayed line in the "Compose" window section 760 and either modify it, or cause the highlighted word to be looked-up in the Glossary by clicking on the Glossary button 766. It the Localizer finds a better translation (for his locale) of the highlighted word/phrase in the glossary, he can select that entry in the Glossary window (see FIG. 12) and then cause that Glossary selection to replace the highlighted word/phrase in the "Compose" window 760 by clicking on the "Glossary Retrieve" button 768. Having modified the message he is working on in the "Compose Window" 760, the Localizer can insert this modified message in the summary of the file (for example file "oampkg.po" 403) by clicking on the "Apply" button 764. When the Localizer has completed translating all entries in the summary of the file, he uses the "Save button 769 at the top of the "Translation Assistant" window 750.

Figure 16:
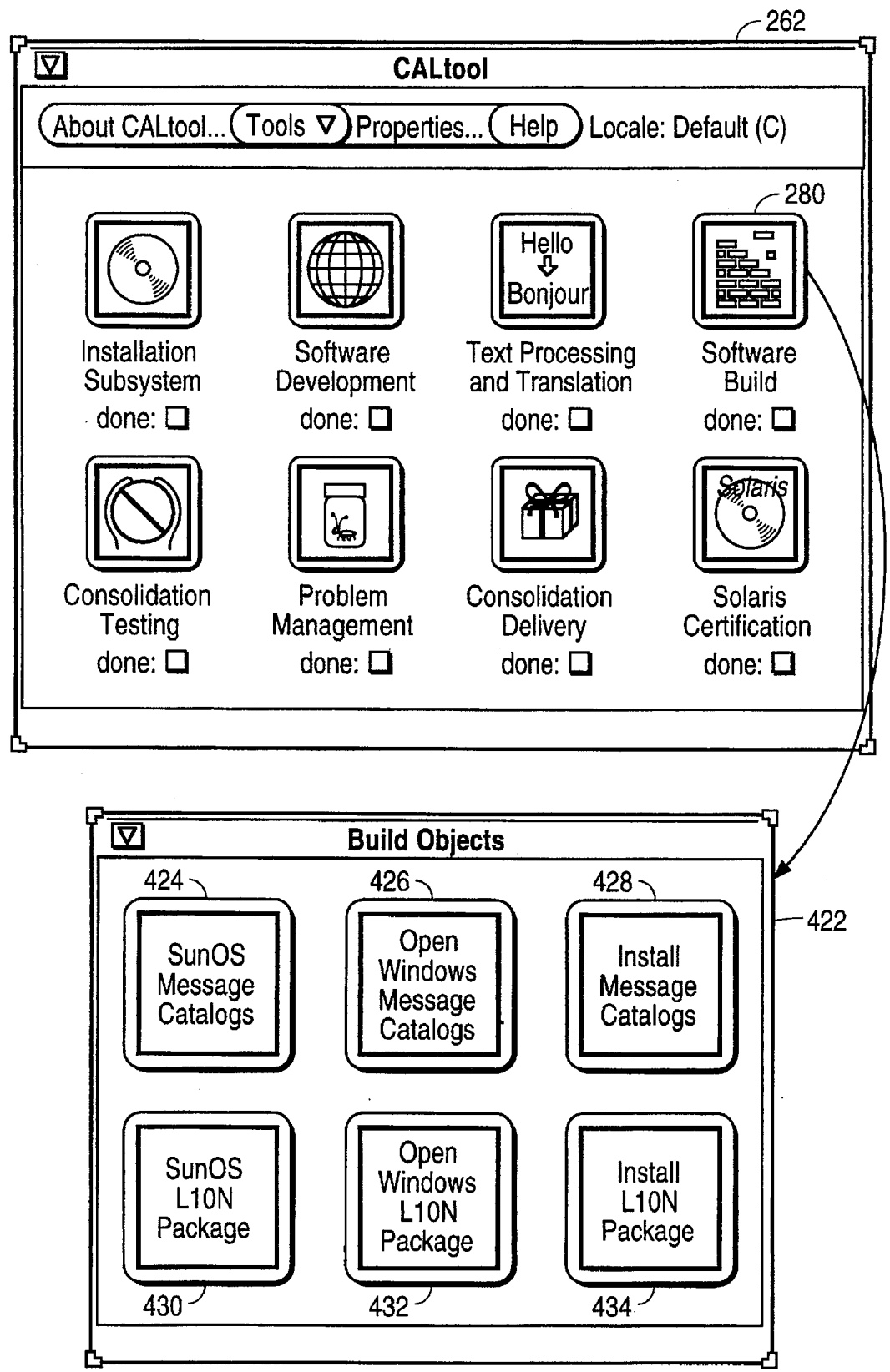
FIG. 16 illustrates the Build objects window.
Figure 18:
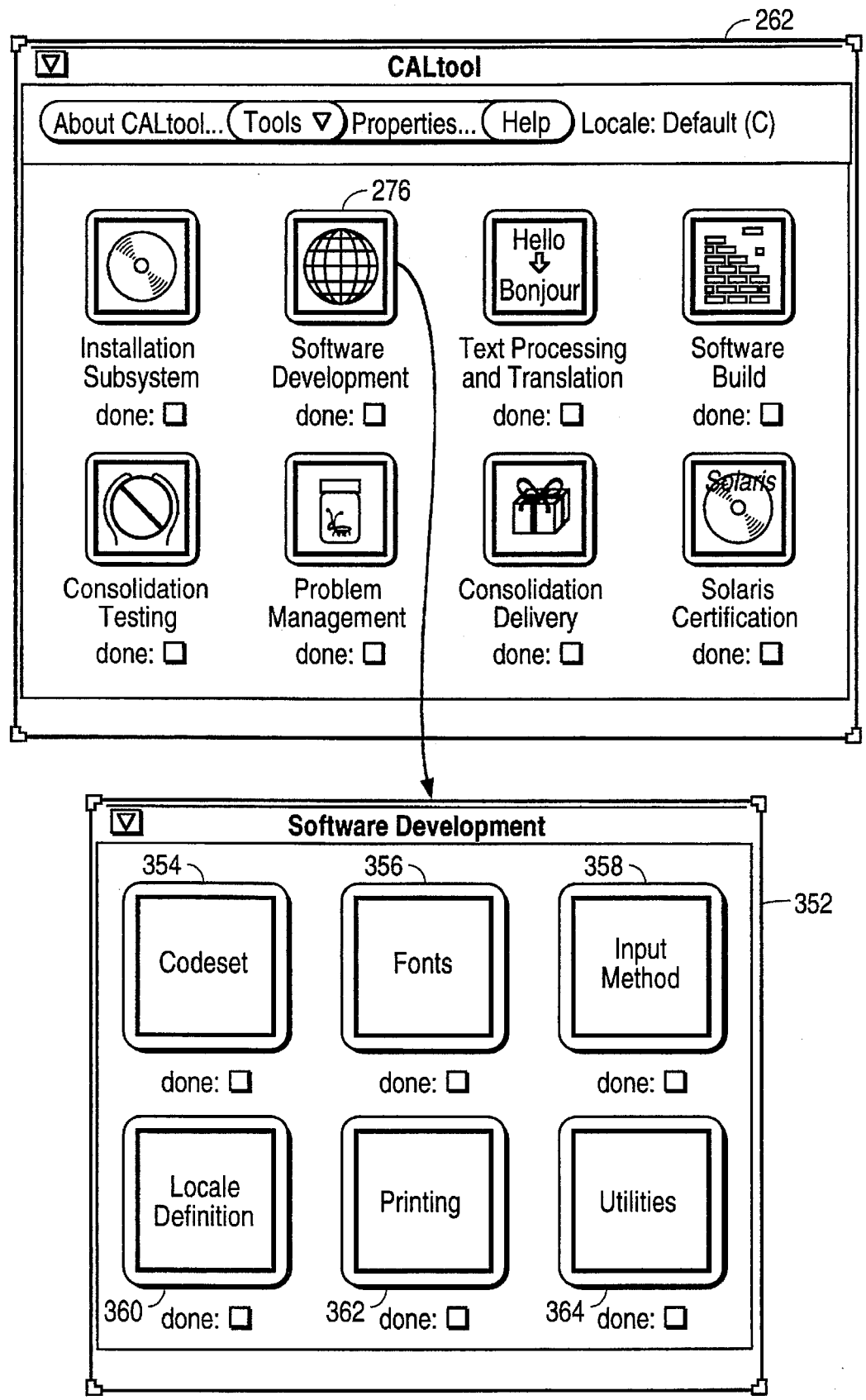
FIG. 18 illustrates the Software Development process.

At this stage of the exemplary process of using the Localization Kit, the localizer/user has completed the translation of the text, menus and other required documents. If any customized software subprograms need to be written for the particular locale, the localizer/user clicks on the "Software Development" icon (276 on the CALtool GUI 262 shown in FIG. 9). This brings up a "Software Development" window 352 shown in FIG. 18, which contains icons 354 through 364 which guide the localizer/user in the development of this new software. Clicking on these icons 354 through 364 each brings up "Help" documentation designed to guide the localizer/user through the required software development steps. If no customized software subroutines are required to be added to the target computer program (for specialized character/font handling, for example), the localizer/user can proceed to build the binary files of all of the materials he has completed translating and the overlay of these new binary files onto the binary image of the target program. To do this he clicks on the "Software Build" icon 280 on the CALtool GUI 262 on FIG. 16, bringing up a "Build Objects" window 422 containing icons (424 through 436) to guide the building of the binary packages. Clicking on each of these icons (424 through 436) causes a "CALtool Software Builder" window to appear. This "CALtool Software Builder" window is used by the localizer/user to build the binary components of the localization and the packages that contain them for installation purposes. The localizer/user clicks on each of these icons (424 through 436) in turn to complete the binary build operation. The packages contain the files (both binary and human-readable) that comprise the localization and contain the definition of how they are to be overlaid onto or linked with the original target program binary image.

Figure 17:
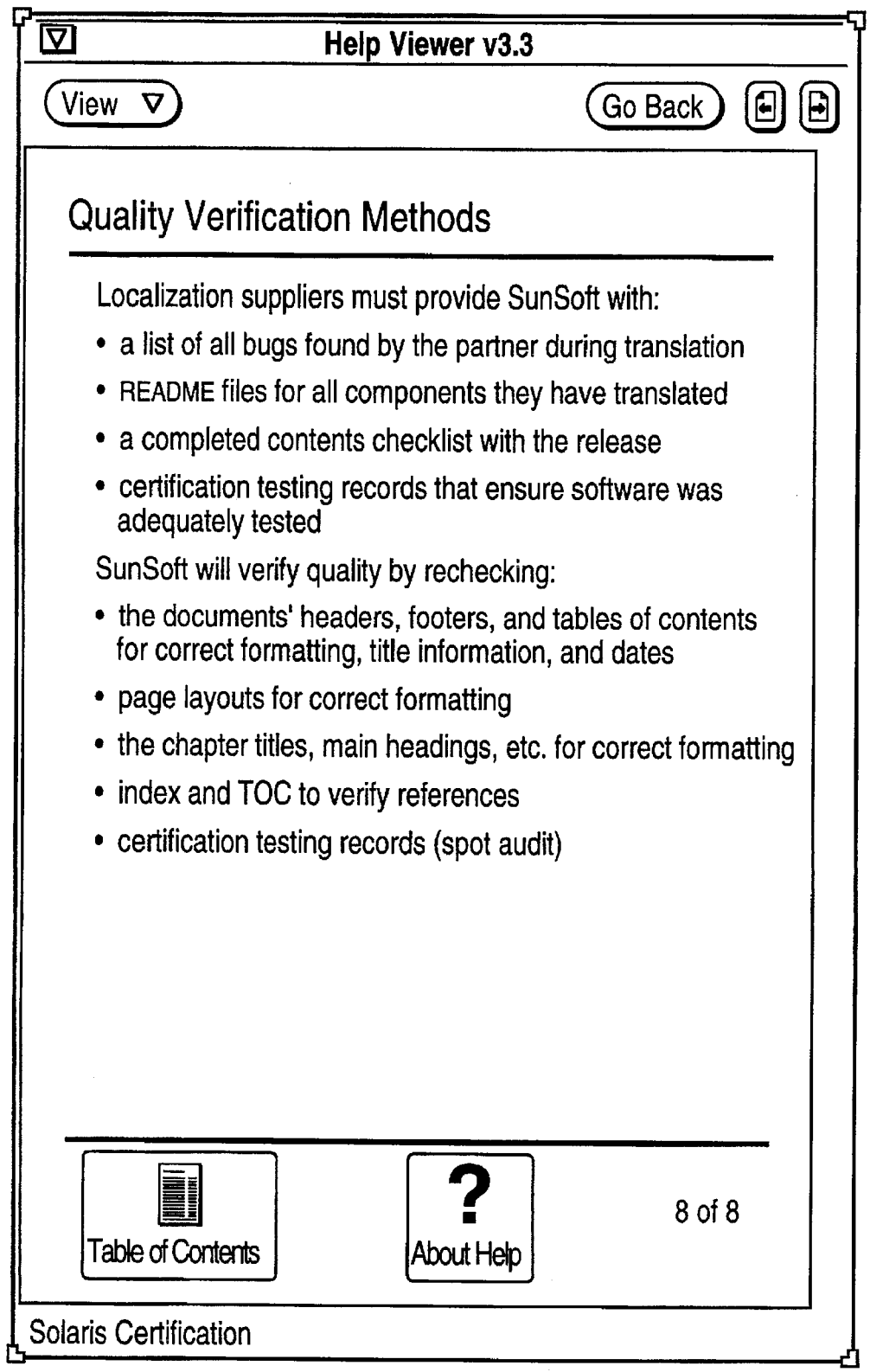
FIG. 17 illustrates an exemplary Help Viewer screen showing instructions to the user.

Having the target computer program product localized, the localizer/user is now ready for testing the localized product, recording any problems/bugs observed in the testing, consolidating the materials needed for delivery and for certification by the original product manufacturer that the localized version is acceptable for branding. Each of these tasks are symbolized by icons 282, 284, 286 and 288 in FIG. 9 on the Caltool GUI 262. Clicking on each of these icons brings up on the screen, the "Help" documents related to these activities, describing in some detail the steps and materials needed to complete each activity. A sample of one of these "Help" screens associated with the "Certification" step 288 in FIG. 9 is shown in FIG. 17.

In the preferred embodiment of the system, the installation subsystem of the invention (the Localization Kit system) comprises the components: EZInstall GUI front end; the Custom Installation front end; the Installation data and scripts; and a location independent naming system. The first three of these components have been described above. The Naming System (Name Space Object) is now described. The installation subsystem provides the initial interface to the location independent naming system (Name Space Object), setting values for determining path names at runtime. The Name Space Object is also linked in with the tools in the Localization Kit, and is therefore invoked at run-time to resolve path names as needed. The two principal motivations for the Name Space Object are: (1) Allowing the L10N Kit to shield the user from having to remember cryptic file names or path names. The volume of files managed by the L10N Kit makes this mandatory; and (2) Tools within the Kit invoke each other, but their path names are not known until installation-time. Furthermore, since a strict parent-child forking relationship cannot be guaranteed, solutions depending on environment inheritance are not reliable. Those skilled in these arts will recognize that there are innumerable ways of dealing with the coordination of the many file names and path names, but that in general such coordination in this Kit environment is mandatory for efficiency's sake. In the preferred embodiment, when the Localization Kit tools are built, the naming system is linked in with the tools. A set of name space tokens is defined (registered), to which values will be assigned at installation-time. (Tokens are also organized as domains, to simplify token management. For example, the "Domain" may simply be the tool name.) At installation-time, the Name Space Object stores fundamental naming parameters concerning the components of the Kit. At run-time the invoked tool queries the Name Space Object by using a registered token and domain. The Name Space Object computes the path name associated with the token, and returns the result to the tool. The tool then uses that path name to access the desired component. In the preferred embodiment, the external interface of the Name Space Object is shown in FIG. 19; an exemplary implementation of the Name Space Object in pseudo-code form is shown in FIG. 20; and the architecture of the location information database is shown in FIG. 21.

Figure 23:
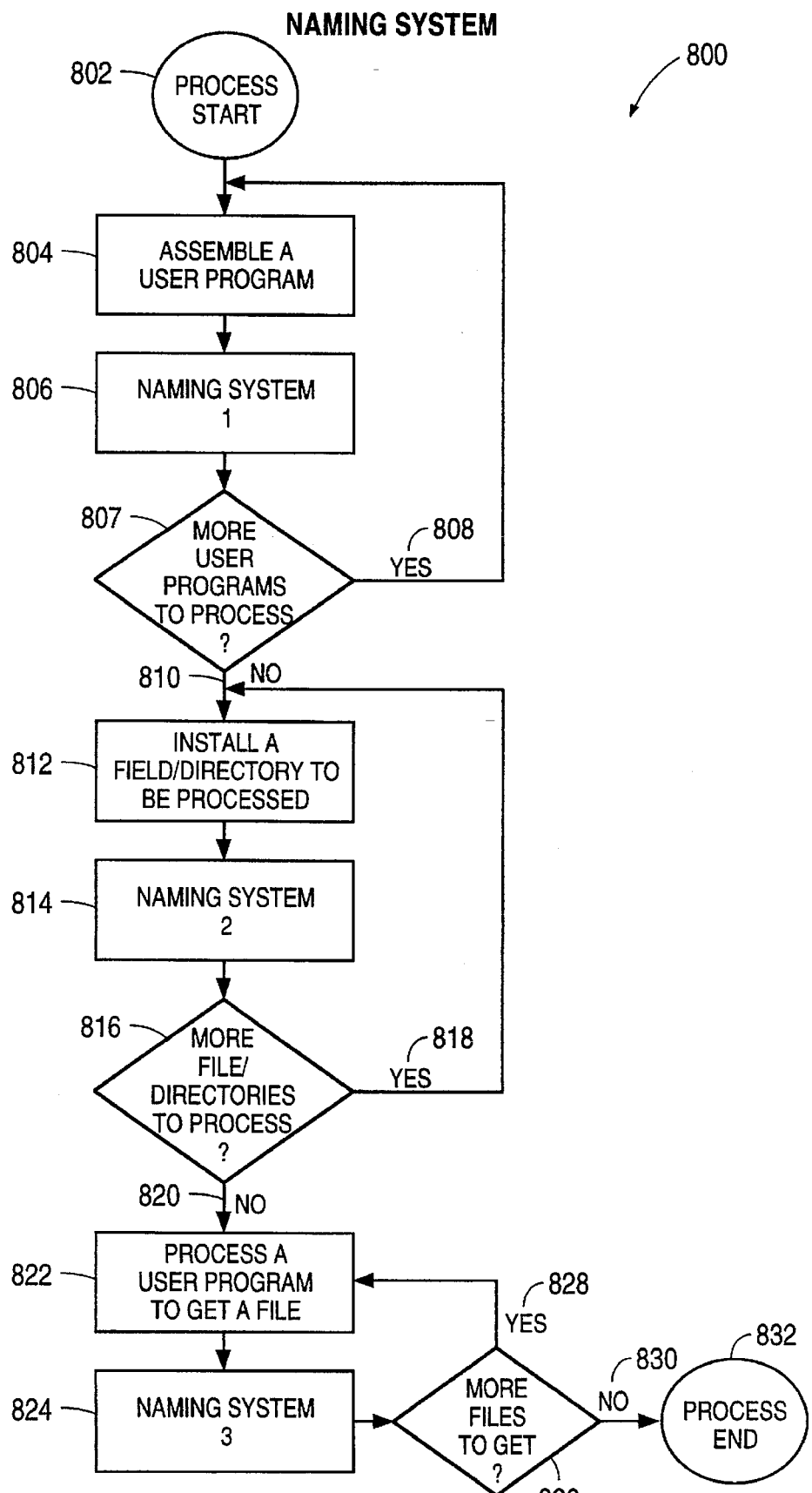
FIG. 23 depicts a flow chart an exemplary use of the Naming System.

Referring now to FIG. 23, the Naming System 800 is described in more detail. A typical embodiment of the Naming System 800 begins with a process start 802 which initiates the assembly of one or more user programs. The user program assembly step 804 calls the Naming System (here designated "Naming System 1" 806) to perform a preliminary register operation which is described below. "Naming System 1" 806 may be called for each user program being assembled 807, 808. When all user programs have been assembled 810, or at some later time, a process of installing the assembled programs and any files the programs will need will occur. At that time, as each file/directory is installed 812 the Naming System will again be called (designated "Naming System 2" 814), and would be called for each file 816, 818, until all files/directories to be installed were completed 820. At that time, the user programs would typically be executed to perform some task 822. During such user program execution the Naming System would again typically be called upon (here designated "Naming System 3" 824) to locate a file/directory and to provide the location information to the user program. "Naming System 3" would be called on repeatedly 826,828 until all required files had been obtained 830 and the user process completed 832.

Figure 24:
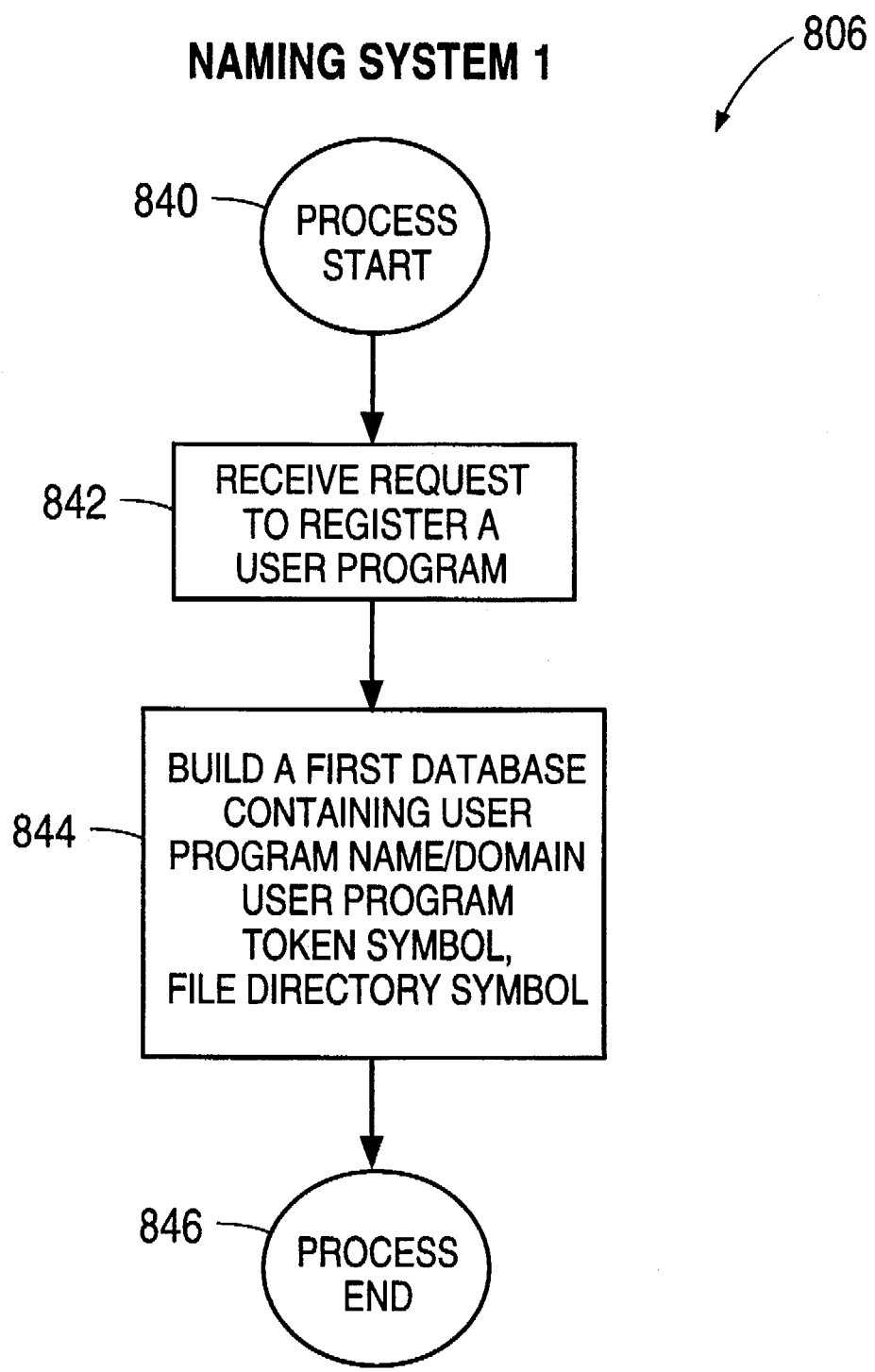
FIG. 24 is a flow chart of the functions of Naming System 1.

The functions of the Naming System designated "Naming System 1 806", "Naming System 2 814" and "Naming System 3 824" are now described. Referring now to FIG. 24, the "Naming System 1 806" function begins with an assembly-time process 840 which requests the Name System to register the files/directories of a user program being assembled 842. "Naming System 1 806" builds a first data base which contains, as arguments, the user program name or domain and a user program designated "Token symbol" which acts as a pseudonym for a file/directory path name; and with the corresponding function being a file/directory symbol (variable name) 844. It is pointed out that at this stage of the assembly process the actual location information (path name, etc.) for the referenced file is not known, and thus the function portion of the first data base entry which is registered contains only a file/directory symbol. When the data base entry is registered the process of "Naming System 1 806" is ended 846. Those skilled in the art will recognize that this first data base, which is built at program assembly time, may be built in read-only memory in either a software or hardware embodiment.

Figure 25:
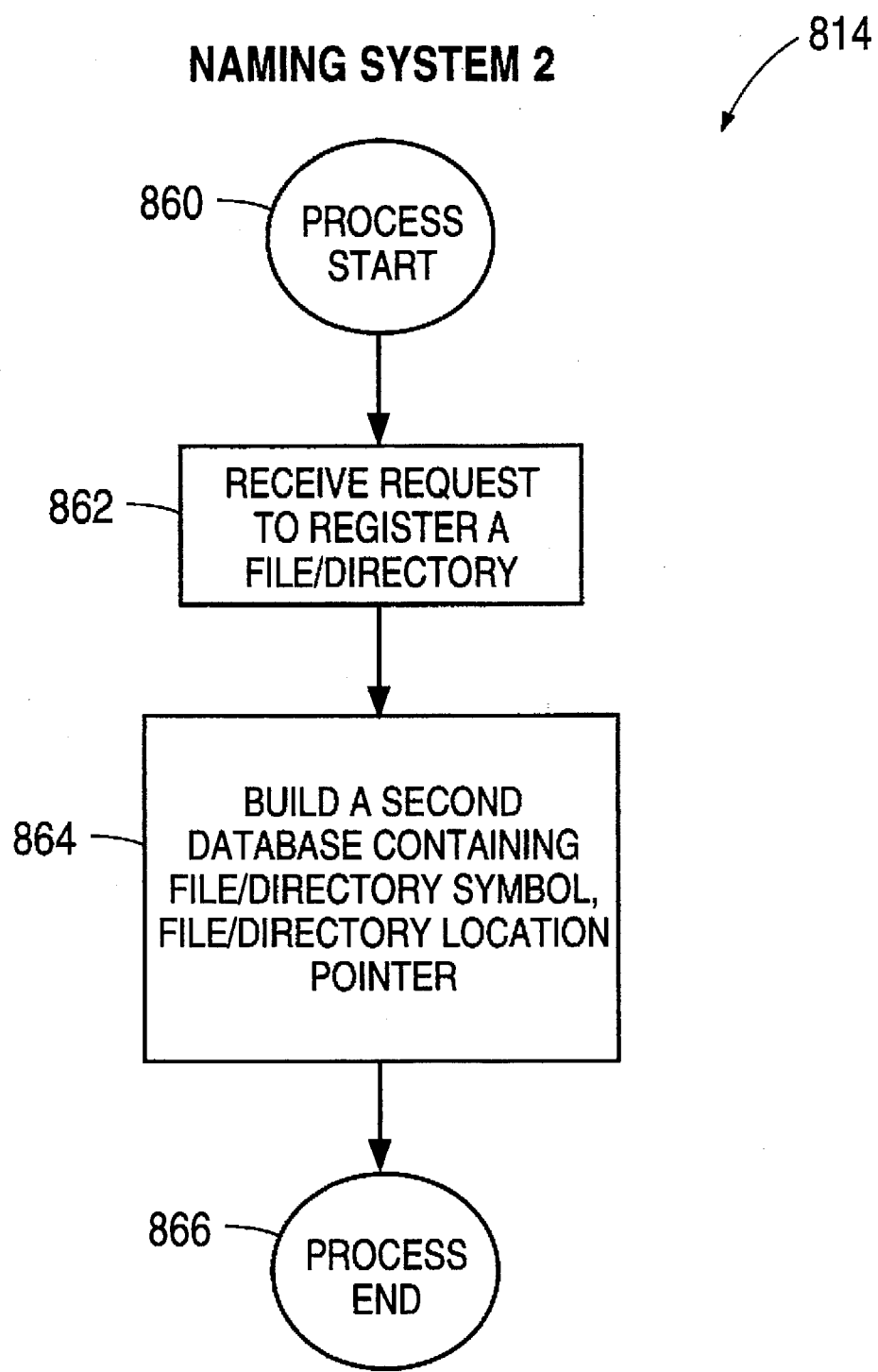
FIG. 25 is a flow chart of the functions of Naming System 2.
Figure 26:
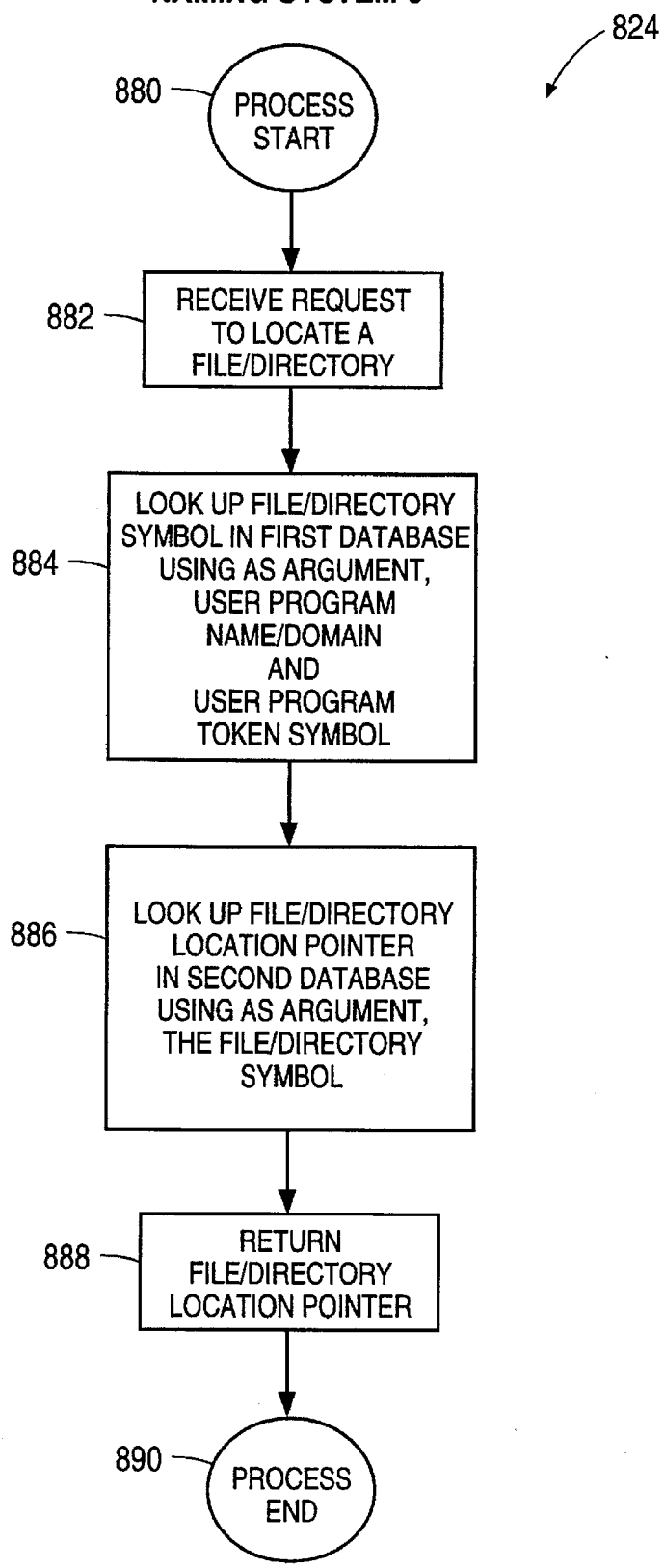
FIG. 26 is a flow chart of the functions of Naming System 3.

Referring now to FIG. 25, the of "Naming System 2 814" function begins with an install-time process 860 which requests the Name System to register the files/directories of the process which are being installed in the computer system 862. "Naming System 2 814" builds a second data base which contains, as arguments, the file/directory symbol (variable name); and with the corresponding function being the actual file/directory location pointer (path name, etc.) 864. It is pointed out that at this stage of the installation process the actual location information (path name, etc.) for the referenced file is now known, and thus the function portion of the second data base entry contains the actual file/directory location pointer (path name, etc.). Thus the combination of the first data base built in the "Naming System 1 806" process, and the second data base built in the "Naming System 2 816" process, would permit the Naming System to receive a request from a user for a file/directory (using only the "Domain & Token" symbols to reference the file) and to return to the user the actual file/directory location (path name, etc.). It is this function which is performed by "Naming System 3 824" which is now described with reference to FIG. 26. A run-time process begins 880 when "Naming System 3 824" receives a request to locate a file/directory 882. "Naming System 3 824" is given the "Domain & Token" symbols for the requested file/directory, and these data are used as an argument to search the first data base. If no match to the "Domain & Token" symbols is found, a Null response is returned to the requesting process. If a match to the "Domain & Token" symbols is found, the Naming System gets the associated function in the first data base which is the file/directory symbol (variable) 884. The Naming System then uses this found file/directory symbol (variable) as the argument to search the second data base. If no match to the found file/directory symbol (variable) occurs, the Naming System will return a Null response. An alternate embodiment, would have the Naming System attempt a dynamic load of the missing file at that time. If a match to the found file/directory symbol (variable) occurs, the Naming System gets the associated function in the second data base which is the file/directory location pointer (path name, etc.) 886 and will return that found location pointer to the requestor 888 whereupon the search process is ended 890. Those skilled in the art will recognize that the Naming System described above in the context of an embodiment within the Localization Kit of the present invention, may be used and embodied in any process wherein it is desirable to write and assemble user programs with only symbolic references to some indeterminate number of files which may be processed in the future by those programs, and where it is desirable to automatically connect the later installed files to the earlier assembled program file references, thereby relieving the programmer/user of having to learn the various file names and make necessary connections manually.

Although the present invention has been described with reference to particular operating systems, program code mechanisms, and object and object reference definitions, it will be appreciated by one skilled in the art that the present invention may be implemented in any one of a number of variations within a given operating environment, or in different operating system or object system environments. Similarly, particular computer client and server configurations or combinations illustrated are only representative of one of many such configurations of clients and servers and object and sub-object relationships which may use the present invention. Moreover, it will be understood that the figures are for illustration only and should not be taken as limitations on the invention. Some additional combinations of the localization kit tools with other functions include the combining of the Glossary or translation tools with a different Graphical User Interface ("GUI") agent that provides a friendly user interface to other target objects; the combining of the localization tools with an artificial intelligence agent which modifies remote requests based upon the user's known preferences; the combining of the CALtool with a caching program that caches remote translation or localization requests; the combining of the localization tools with machine translation utilities; or the combining of a localization kit with a number of audio and video accessing agents in a multimedia system. These possible localization kit tools/applications combinations are not intended to limit in any way the possible uses of the localization kit functions as disclosed herein, but merely represent some examples which those skilled in these arts will recognize as merely exemplary.

What is claimed is:

1. A system for localizing a target computer program, said system comprising:

a computer system having a central processing unit ("CPU"), a memory and an input and an output device;

an executable binary version of a target computer program loaded in said memory of said computer system: and a localization kit loaded in said memory of said computer system, said localization kit comprising an integrated set of tools, said localization kit for use by a user of said computer system to localize a portion of said target computer program into a language different from said target computer program's language, said portion of said target computer program comprising at least two of the following: error messages, button labels, menu items, text in icons, locale specific data for formatting time, currency or sort order; said localization kit also for use by said user to bind a binary version of said localized portion with said executable binary version of said target computer program to produce a localized version of said executable binary version of said target computer program.

2. A system as recited in claim 1 wherein said target computer program is an internationalized target computer program wherein messages, menus and other locale specific data are located in one or more portions of said target computer program which are separate from executable code of said target program, said executable code comprising portions of said target computer program which require no localization.

3. A system as recited in claim 1 wherein said localization kit comprises:

a plurality of program tools and files which are independent of said target program; and a plurality of files which are dependent upon a release version of said target program comprising one or more portions of said target computer program which contain data to be localized.

4. A system as recited in claim 3 wherein said plurality of program tools and files which are independent of said target program comprises a computer aided localization tool ("CALtool") which comprises a plurality of computer display icons, said icons comprising symbols which depict steps to guide a user in localizing said target program.

5. A system as recited in claim 3 wherein said plurality of program tools and files which are independent of said target program further comprises:

a glossary tool for assisting a user in translating existing terminology into a different language;

a data base manager program for use by said glossary tool; and a data base of technical terms and their translations into a plurality of languages, said data base for use by said data base manager.

6. A system as recited in claim 3 wherein said plurality of program tools and files which are independent of said target program further comprises:
  a translation tool for assisting a user in translating existing internal messages and external documentation for said target program into a different language; and
  an on-line publishing tool for use by said translation tool to store and retrieve messages and documentation in a plurality of formats.

7. A system as recited in claim 3 wherein said plurality of program tools and files which are independent of said target program further comprises a problem reporting tool for use to record, store and report a problem defined by a user, said problem related to an attempt to localize said target program.

8. A system as recited in claim 3 wherein said plurality of program tools and files which are independent of said target program further comprises a build tool portion of said localization kit, said build tool for use to assemble localized materials into a binary version of said localized materials, said localized materials comprising said localized portion of said target computer program, said build tool also for use to connect said binary version of said localized materials with said binary version of said target computer program to produce a localized version of said target computer program.

9. A system as recited in claim 3 wherein said plurality of program tools and files which are independent of said target program further comprises a test tool for use to assist a user to perform functional and language tests on a localized target computer program.

10. A system as recited in claim 3 wherein said plurality of program tools and files which are independent of said target program further comprises a name space server for use to coordinate and control a location of said portion of said target computer program which contains materials to be localized as contained in said binary version of said target computer program and as contained in said localization kit in order to provide said location to said plurality of program tools.

11. A computer program product comprising a computer usable storage media having computer readable code mechanisms embedded therein for for localizing an executable binary version of a target computer program, said localization being performed on a computer having a processor, a memory and various peripheral devices, said computer readable code mechanisms comprising a plurality of program tools and files, designated a localization kit, which are independent of said target computer program, said plurality of program tools and files for assisting a user of said computer to localize a portion of said executable binary version of a target computer program, said portion of said target computer program comprising at least two of the following: error messages, button labels, menu items, text in icons, locale specific data for formatting time, currency or sort order; and for assisting a user to connect a binary version of said localized portion with said executable binary version of said target computer program to produce a localized version of said target computer program.

12. A computer program product as recited in claim 11 wherein said plurality of program tools and files which are independent of said target computer program comprises a computer aided localization tool ("CALtool") comprising a plurality of computer display icons, said icons comprising symbols which depict steps to guide a user in localizing said binary version of a target program.

13. A computer program product as recited in claim 12 wherein said CALtool comprises a graphical user interface ("GUI"), said GUI comprising a plurality of computer display icons, said icons comprising symbols which depict steps to guide a user in localizing said binary version of a target program.

14. A computer program product as recited in claim 11 wherein said plurality of program tools comprises:
  a glossary tool for assisting a user in localizing existing terminology into a different language;
  a data base manager program for use by said glossary tool; and
  a data base of technical terms and their translations into a plurality of languages, said data base being for use by said data base manager.

15. A computer program product as recited in claim 11 wherein said plurality of program tools comprises:
  a translation tool for assisting a user in translating existing internal messages and external and on-line documentation for said target computer program into a different language; and
  an on-line publishing tool for use by said translation tool to store and retrieve messages and documentation in a plurality of formats.

16. A computer program product as recited in claim 11 wherein said plurality of program tools comprises a problem reporting tool for use to record, store and report a problem defined by a user, said problem related to an attempt to localize said target computer program.

17. A computer program product as recited in claim 11 wherein said plurality of program tools comprises a build tool for use to assemble a binary version of localized materials, said localized materials comprising said localized portion of said target computer program, a newly created subprogram if said subprogram was created in a localization process, and localized glossary and message files, said build tool also for use to overlay said binary version of said localized materials onto a binary version of said target computer program to produce a localized version of said target computer program.

18. A computer program product as recited in claim 11 wherein said plurality of program tools comprises a test tool, said test tool for use to assist a user to perform measurements and language tests on a localized target computer program.

19. A computer program product as recited in claim 11 wherein said plurality of program tools comprises a name space server, said name space server for use to coordinate and control a location of said portion of said target computer program to be localized as contained in said binary version of said target computer program and as contained in said localization kit.

20. A method for localizing a binary version of a target computer program into any desired language, said method comprising the steps of:
  providing a computer system having a central processing unit ("CPU"), a memory and an input and an output device, said memory containing a binary version of a target computer program;
  installing a localization kit into said computer system, said localization kit comprising a plurality of program tools and files for assisting a user of said computer system in localizing a portion of said binary version of a target computer program;
  using said localization kit to localize a portion of said binary version of a target computer program into a language different from said target computer program's language, said portion of said binary version of a target computer program comprising at least two of the following: error messages, button labels, menu items, text in icons, locale specific data for formatting time, currency or sort order; and using said localization kit to connect a binary version of said localized portion with said binary version of said target computer program to produce a localized version of said target computer program.

21. A method as recited in claim 20 wherein said target computer program is an internationalized target computer program.

22. A method as recited in claim 21 wherein said step of installing a localization kit into said computer system comprises the steps of:

installing a plurality of program tools and files which are independent of said target computer program into said computer system; and installing a plurality of files which are dependent upon a release version of said target computer program into said computer system, said plurality of files comprising a portion of said release version of said target computer program which is localizable.

23. A method as recited in claim 22 wherein said step of installing a plurality of program tools and files which are independent of said target computer program comprises the additional step of installing a computer aided localization tool ("CALtool") which comprises a plurality of computer display icons, said icons being used to guide a user in localizing said target computer program.

24. A method as recited in claim 22 wherein said step of installing a plurality of program tools and files which are independent of said target computer program comprises the additional steps of:

installing a glossary tool into said computer system, said glossary tool for use in assisting a user in translating existing terminology into a different language;

installing a data base manager program for use by said glossary tool;

installing a data base of technical terms and their translations into a plurality of languages for use by said data base manager program; and using said glossary tool to assist in the translation of glossary terms into a local language.

25. A method as recited in claim 22 wherein said step of installing a plurality of program tools and files which are independent of said target program comprises the additional steps of:

installing a translation tool into said computer system, said translation tool for use in assisting a user in localizing existing internal messages and external documentation for said target computer program into a different language;

installing an on-line publishing tool for use by said translation tool to store and retrieve messages and documentation in a plurality of formats; and using said translation tool to assist said user in translating existing internal messages and external and on-line documentation for said target computer program into a different language.

26. A method as recited in claim 22 wherein said step of installing a plurality of program tools and files which are independent of said target computer program comprises the additional steps of:

installing a problem reporting tool into said computer system: and, using said problem reporting tool to record, store and report a problem defined by a user, said problem related to an attempt to localize said target program.

27. A method as recited in claim 22 wherein said step of installing a plurality of program tools and files which are independent of said target computer program comprises the additional steps of:

installing a build tool into said computer system;

using said build tool to assemble localized materials into a binary version of said localized materials, said localized materials comprising said localized portion of said target computer program, a newly created subprogram if said subprogram was created in a localization process, and localized glossary and message files; and using said build tool to connect said binary version of said localized materials with a binary version of said target computer program to produce a localized version of said target computer program.

28. A method as recited in claim 22 wherein said step of installing a plurality of program tools and files which are independent of said target computer program comprises the additional steps of:

installing a test tool into said computer system; and using said test tool to assist a user to perform functional and language tests on a localized target computer program.

29. A method as recited in claim 22 wherein said step of installing a plurality of program tools and files which are independent of said target computer program comprises the additional steps of:

installing a name space server into said computer system; and using said name space server to coordinate and control a location of said portion of said target computer program to be localized, and to provide said location to said plurality of program tools.

30. A method as recited in claim 22 wherein said step of installing a plurality of program tools and files which are independent of said target computer program comprises the additional steps of:

installing a software development tool into said computer system; and using said software development tool to assist a user to create software subsystems for addition to said target computer program.

31. A method as recited in claim 22 wherein said step of installing a plurality of program tools and files which are independent of said target computer program comprises the additional steps of:

installing a certification tool into said computer system; and using said certification tool to assist in the certification of a localized version of said target computer program.

32. A method for a person in any country to use in localizing a target computer program into a language of the person's choice, said method comprising the steps of:

providing a computer system having a central processing unit ("CPU"), a memory, a display and an input and an output device;

loading a localization kit into said computer system, said localization kit comprising a portion of said target computer program which is localizable;

invoking a computer aided localization tool ("CALtool") which comprises a plurality of computer display icons, said icons comprising symbols for use in guiding said person from one step to a next step in localizing said target computer program;

using said CALtool in localizing said portion of said target computer program which is localizable, said portion of said target computer program which is localizable comprising at least two of the following: error messages, button labels, menu items, text in icons, locale specific data for formatting time, currency or sort order;

creating a binary version of said localized portion of said target computer program; and connecting said binary version of said localized portion of said target computer program with an executable binary version of said target computer program thereby producing a localized version of said target computer program.

33. A system for use by a person in any country in localizing a target computer program to any language the person desires, without the necessity of having the source code of the target program available, said system comprising:

a computer system having a central processing unit ("CPU"), a memory and an input and an output device;

a binary version of a target computer program loaded into said memory of said computer system: and a localization kit loaded into said memory of said computer system, said localization kit for use to assist a user of said computer system in any country to localize a portion of said binary version of a target computer program into a language different from said binary version of a target computer program's language, said portion of said binary version of a target computer program comprising at least two of the following: error messages, button labels, menu items, text in icons, locale specific data for formatting time, currency or sort order; and for use to produce a localized executable binary version of said target computer program.

34. A method for localizing a target computer program, said method comprising the steps of:

providing a computer system having a central processing unit ("CPU"), a memory and an input and an output device;

installing an executable target computer program into said computer system;

installing a localization kit into said computer system; and using said localization kit to localize a portion of said target computer program into a language different from said target computer program's previous language, said localization being performed by a developer in any country who wishes to localize the target program to his or her language, said portion of said target computer program comprising at least two of the following: error messages, button labels, menu items, text in icons, locale specific data for formatting time, currency or sort order.

35. A computer implemented system for localizing a target computer program comprising:

a localization kit comprising a plurality of tools to guide a localization of said target computer program by a developer in any country who desires to localize the target program to his country's language, and a file of data to be localized, said file of data to be localized comprising at least two of the following: error messages, button labels, menu items, text in icons, locale specific data for formatting time, currency or sort order; and a name space object to provide a path name to said file of data to be localized, said path name being provided to one of said plurality of tools whenever said file is invoked by said one of said plurality of tools.

* * * * *